United States Patent

Lazarev et al.

[11] Patent Number: 6,130,873
[45] Date of Patent: Oct. 10, 2000

[54] OPTICAL PICKUP AND SERVO CONTROL SYSTEM FOR DIGITAL DATA STORAGE

[75] Inventors: Victor Lazarev, Burlington; Zhijiang Hang, Lexington, both of Mass.; Hiroshi Miyazawa, Saitama, Japan

[73] Assignees: New Dimension Research & Instrument, Inc., Woburn, Mass.; Kenwood Corporation, Tokyo, Japan

[21] Appl. No.: 09/439,880

[22] Filed: Nov. 12, 1999

Related U.S. Application Data

[63] Continuation-in-part of application No. 09/191,022, Nov. 12, 1998.

[51] Int. Cl.$^7$ .................................................. G11B 7/00
[52] U.S. Cl. ........................... 369/116; 369/54; 369/121; 369/44.37
[58] Field of Search .................... 369/116, 112, 369/121, 54, 58, 47, 44.37, 44.28, 44.14, 44.12

[56] References Cited

U.S. PATENT DOCUMENTS

| | | |
|---|---|---|
| 5,757,741 | 5/1998 | Jiang et al. |
| 5,894,467 | 4/1999 | Wang ........................................ 369/121 |
| 6,023,450 | 2/2000 | Park et al. ............................... 369/121 |

FOREIGN PATENT DOCUMENTS 05330909  7/1995  Japan.

OTHER PUBLICATIONS

Samsung Electronics, "Hologram Optical Module using VCSEL," Samsung Electronics Product Information, Samsung Electronics (Place and Date of Publication Not Known).

*Primary Examiner*—Muhammad Edun
*Attorney, Agent, or Firm*—O'Connell Law Firm

[57] ABSTRACT

Methods and apparatus are provided for retrieving encoded information from data tracks on an optical disk using an array of microlasers as the illumination sources, an array of micro-scale photo detectors as the detection elements, and a bilens (BL) or a holographic optical element (HOE) as the main optical component. Multiple configurations are provided to position microlasers and photo detectors together on a mobile laser/detector block (LDB). The microlasers and detectors may be arranged in a hexagonal lattice relationship for an optimally compact arrangement. Laser beams generated by the surface-emitting microlasers are guided by the BL onto the optical disk (OD) surface. The reflected light is collected by the same BL or HOE, shifted, and then directed back onto the respective photo detectors on the LDB. Illumination, detection and alignment methods and apparatus for tracking, focusing, and magnification servo controls are also incorporated on the LDB.

34 Claims, 29 Drawing Sheets

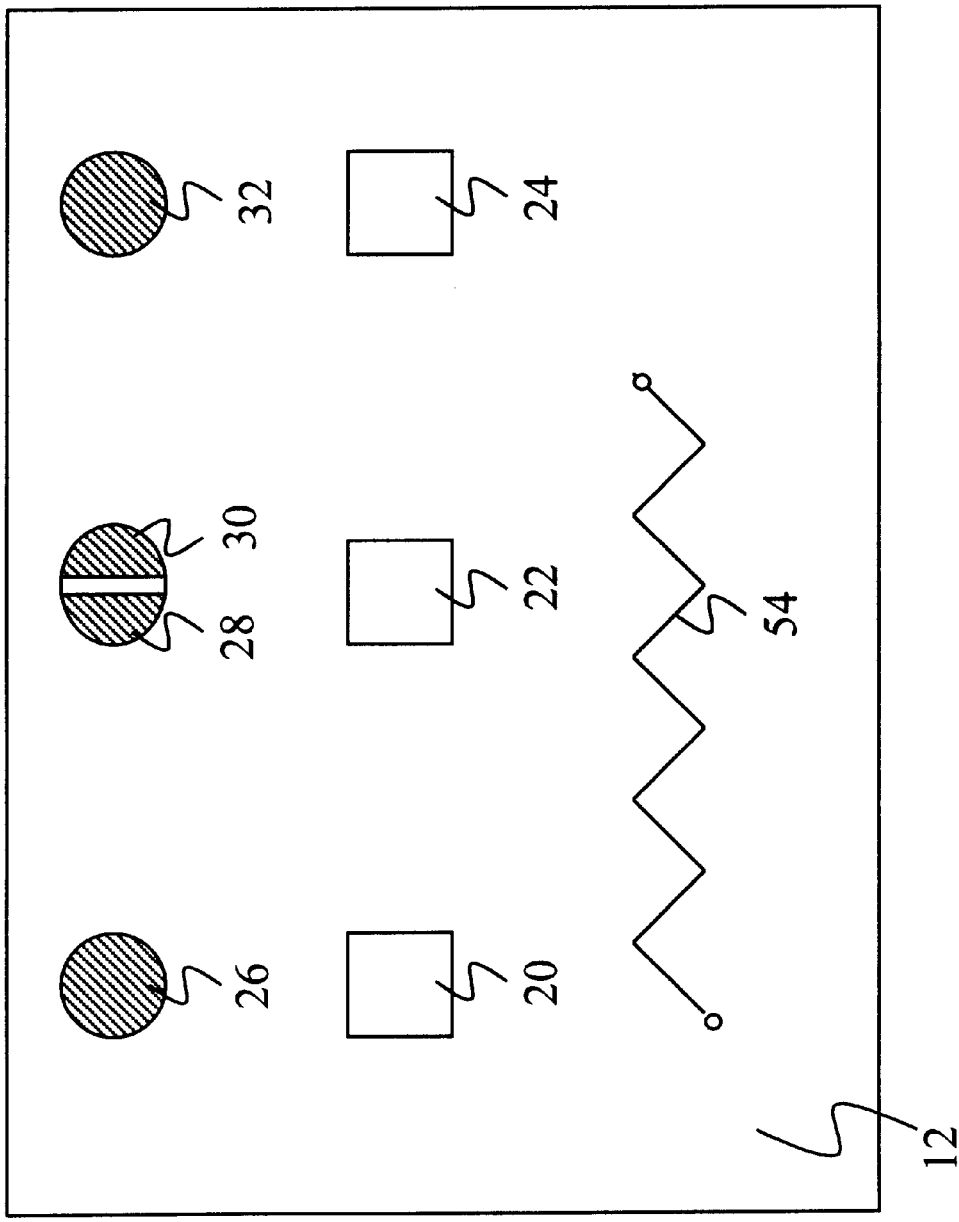

OPTICAL PICKUP AND SERVO CONTROL SYSTEM FOR DIGITAL DATA STORAGE

This application is a C-I-P of Ser. No. 09/191,022 filed Nov. 12, 1998.

FIELD OF THE INVENTION

The present invention relates generally to retrieving encoded information from an optical disk. It is particularly related to methods and apparatus for an information pick-up system within an optical disk reader head. It is also particularly related to methods and apparatus for detecting and compensating for tracking, focusing, and magnification errors. The invention is still more particularly related to the application of surface-emitting semiconductor microlaser and semiconductor photo detectors in miniaturization of data pick-up and servo control methods and apparatus in optical disk reader heads. It is also particularly related to providing mobility and thus capacity of adjustment to data pick-up, tracking, focusing, and magnification servo systems. It is also particularly related to the application of molded aspheric bilens in optical reader heads. This invention is further particularly related to reading single track and simultaneously reading multiple tracks of data on an optical disk to provide the optical reader with very high data transfer rates.

BACKGROUND OF THE INVENTION

Optical disks have become widely used in part due to their relatively high storage capacity. Whereas a 3½-inch floppy disk stores merely 1.44 MB (megabytes) of data, a 12-cm compact optical disk can store upwards of 650 MB. The increased track density and the decreased pit size on a same size DVD-ROM provides 4.7 GB (gigabytes) of memory capacity. Optical disks are therefore increasingly becoming the most popular portable media for audio/video entertainment and data storage. Future development promises to bring increased memory capacity, such as double-sided, dual layer high definition (HD) DVD-ROM of 30 GB, and much shorter seek and access times to optical disk technology. Organizing optical disks in a jukebox that contains dozens to hundreds of disks and several disk drives can form very large archives, thus substantially increasing the value of optical disks as a versatile removable data storage media.

The market demand for optical disk drives is phenomenal. Audio CD players have become a necessary component in home entertainment appliances. The installed base of CD-ROM drives, now an estimated 195 million plus worldwide, will peak after the millennium. DVD, promising a new level of quality and convenience for movies, music, multimedia and interactive software, and digital analysis and storage, will inevitably revolutionize the way we view entertainment and gather information, and are estimated to replace the CD and dominate the optical disk market by the year 2002.

Increased availability of CD and DVD products, coupled with the availability of increasingly faster microprocessors, has created an enormous need for ever-faster optical disk drives. As a result, disk drives capable of operating at multiplied speeds of standard drives are becoming available. While the very first CD-ROM drive, introduced in 1991, operated at 1X speed, the performance of CD-ROM drives has leapfrogged from 8X to 24X speeds over the past year (1997), defying everything from overheating to increased vibration. The notion that faster is better has flattened the CD-ROM drive development cycle to approximately six months. The fastest drives available at present operate at 40X.

Currently available techniques for designing such high speed drives is limited to increasing the rotating speed of the optical disk to reduce data access latency and increase data transfer rate. Unfortunately, a main drawback of using constant angular velocity instead of constant linear velocity is that the data transfer rate across the entire disk is not uniform. Take, for instance, a CD-ROM specified as 24X by the manufacturer. While the data on the outside track may indeed be transferred at 24X, the rate on the inner tracks, where most of today's software is located, is only typically between 12X and 16X. It is unlikely that the manufacturers will be able to deliver reliable drives at or higher than 32X. The very high spindle speed compromises the performance reliability of such optical disk drives by creating additional cooling requirements and various stability issues.

To accelerate the data transfer rate further, another obvious alternative to increasing the disk angular velocity is by reading multiple data tracks simultaneously. Several patents have disclosed attempts to accomplish such a goal. U.S. Pat. No. 4,094,010 to R. Pepperl et al. describes a multi-channel optical disk storage system wherein a single beam is split into several read beams by using a series of partially transmitting beam splitters. In such a scheme, all the different optical elements must be aligned precisely relative to each other to achieve the highest packing density while preventing cross talk between the multiple beams or focused beam spots. Optical alignment is further complicated by thermal drifts, and the adjustment process can be tedious and time consuming. This need and the technical difficulties of achieving stringent optical alignment will inevitably slow down the data transfer rate, thereby defeating the purpose of using a multi-beam configuration.

U.S. Pat. No. 4,074,085 to J. T. Russell describes another multi-beam scheme, in which multiple illumination sources are applied to provide a plurality of record/read beams. The need for optical alignment as stated above imposes similar problems in this design. U.S. Pat. No 4,449,212 to C. W. Reno discloses an attempt to use multiple beams split from the output of a single laser to retrieve data. The beams are independently modulated by an acousto-optic device to record and playback data simultaneously. One skilled in the art will note that the extra device will inevitably complicate the servo system and increase the volume of the embodiment. U.S. Pat. No. 5,619,487 to T. Tanabe, et al. submits an ingenious proposal for two beams to read three tracks, but the sequential integration of the read information along the track is in practice difficult to accomplish.

Alternatively, U.S. Pat. No. 5,426,623 to A. Alon, et al. describes a broad beam illumination approach to multi-track reading. In this case, a static illumination/detection section provides a broad incoherent laser beam through a movable optical head section to illuminate several tracks at once. The reflected beam is directed onto a pixel array on the imaging detector. Unfortunately, incoherent light is very disadvantageous when used in CD-ROM pick-up systems. One of the main disadvantages of this broad beam design is that it requires high-energy output of the initial laser beam, risking thermal degradation of the optical disk surface and adding further cooling requirements. The incoherency of the light reduces image contrast provided by interference effect. The broad area of reflected disk image makes the algorithm for detector array pixel analysis extremely complicated and potentially inaccurate or unreliable.

In yet another design described in U.S. Pat. No. 5,729,512 to A. Alon, a multi-beam approach is proposed. A diffraction grating splits a single laser beam into seven evenly spaced and discrete beams to read data from seven adjacent tracks.

The central beam is responsible for focusing and tracking. Seven separate optical pickups read the reflected beams and pass the signals through an integrated circuitry that multiplexes the data while performing focusing and tracking error calculations and corrections. Current commercially available multi-beam CD-ROM drives operate at 40X, offering a maximum data transfer rate of 6.0 MB/sec. Concomitantly, the ceiling of laser output energy destines the split beams at the border to be low, thus compromising the accuracy and reliability of the reading and complicating the signal analysis system. The same problems also limit maximum number of split beams (currently at seven) for reading even greater number of tracks at the same time. Additional optical elements required by the device further compound the bulkiness of the pick-up system and increase the manufacturing cost.

Implementing simultaneous multi-track reading capability in optical disk drives presents further difficulties related to focusing and tracking operations. Two conventional methods for focusing and tracking in CD-ROM drives are described on pages 338–348 of L. Buddine and E. Yong, *The Brady Guide to CD-ROM*, (1987), published by Brady, New York, which is incorporated herein by reference. A typical system by Philips uses a single beam and swing arm assembly with push-pull tracking and Foucault focusing, while a system by Sony applies a triple-beam and sled combination with screw tracking and astigmatic focusing. Both systems have immobilized and separate illumination and detection sections and complicated optics for directing the laser beam(s) to the optical disk and re-channeling the reflected light to the detectors at a different location than the laser(s).

Direct adaptation of either of these two tracking and focusing methods and apparatus in multi-track reading systems would require additional, costly optical components and risk compromises in accuracy and reliability of data retrieval. Patents regarding such modifications can be found in the prior art. U.S. Pat. No. 5,708,634 to A. Alon, et al. describes a modification of the Sony focusing system using quadrant detectors for application in the aforementioned design of broad beam illuminating multiple optical tracks. Also, U.S. Pat. No. 5,728,512 to A. Alon describes an error compensation system for tracking and magnification using servo systems to analyze the signals from photodiodes with multiple divisions.

Increased complexity in these data reading and focusing and tracking error correction systems is likely to increase the volume of the embodiment and the adjustment response latency in a manner that is counterproductive to the twin goals of achieving compactness and high data transfer rate. However, the inventors have realized that recent advances in microlasers and micro-scale photo detectors and molded aspheric optics provide options of co-localizing and consolidating multiple elements thereby making better alternative designs with more significant advantages possible.

Because of size constraints, conventional optical disk reader heads only use a single edge-emitting laser and one or more detectors. The lower size limit for fabrication of edge-emitting lasers is 50 microns in width and 100–200 microns in length. In comparison, Vertical Cavity Surface-Emitting Lasers (VCSELs) can be made to minute circular units of less than 10 microns in diameter. Advantageously, VCSELs' vertical beam emission property allows them to form a two-dimensional laser array. Current VCSELs emit at wavelengths between 650 nm and 980 nm. They are made of GaAs/GaAlAs, InGaAs, GaInP and AlGaAs, InP, having a sandwiched structure of multi-layer reflective surfaces between which multiple quantum-wells are formed. Two-dimensional laser array can be manufactured through Molecular Beam Epitaxy (MBE) or Metal Organic Chemical Vapor Deposition (MOCVD) and lithography.

U.S. Pat. No. 5,526,182 to J. L. Jewell et al. describes the implementation of 1-dimensional and 2-dimensional arrays of VCSELs in optical memory system with multi-beam reading multi-track capacity. The present inventors have discovered that a main drawback of this design is that the detectors are not incorporated with the micro-lasers on the same array block. A preferable choice of detector for VCSEL is Resonance Cavity Photo Diode (RCPD) because of similar manufacturing process and RCPD's high sensitivity (>85% of quantum transfer efficiency) in a narrow spectral region around VCSEL's wavelengths.

The inventors have further explored the integration of lasers and detectors on the same chip. Ortiz et al. have first successfully demonstrated in 1996 (Electronics Letters, Vol. 32, No. 13, pp. 1205–6, which is incorporated herein by reference) the monolithic integration of VCSELs and RCPDs on the same substrate with the same epilayer design. Construction of VCSEL and RCPD arrays with control circuits and signal amplifiers on the same movable block allows the functional integration of all the optical interconnection and optoelectronic interface functions in a very compact format. It also simplified the optical interconnect package by facilitating the integration of optoelectronic components with beam tracking, focussing, and magnification functions. The application of molded aspheric lenses will also markedly simplify the optical system by packing more functions into a small element. Advanced semiconductor techniques such as different types of lithography have made it possible to fabricate microlasers and detectors on a massive scale at extremely low cost. The miniaturized pick-up system can be further modified into reading optical data encoded on wallet-size personal information and medical history cards such as those described in U.S. Pat. No. 4,745,268 to J. Drexler.

In view of the foregoing, it would be desirable to provide compact, fast, and low cost optical reading and servo control methods and apparatus for single-track reading of an optical disk.

It would also be desirable to provide compact, fast, and low cost optical reading methods and apparatus for simultaneous multi-track reading of an optical disk to achieve very high data transfer rates.

It would also be desirable to provide compatible tracking, focusing, and magnification methods and apparatus to be employed in the optical reading systems for single-track and multi-track optical data reading.

It would also be desirable to provide optical reading methods and apparatus with expandable capacities in the illumination and the detection sections to increase further the number of parallel-read tracks.

It would also be desirable to provide synchronized mobility and position adjustability to the illumination and the detection sections of the optical reading methods and apparatus for single-track and multi-track reading.

It would be still more desirable to provide optical reading methods and apparatus for single-track and multi-track reading using a single simplified and multi-functional optical element in place of multiple, complex, and expensive optical components.

SUMMARY OF THE INVENTION

Advantageously, a principle object of the present invention is to provide compact, fast, and low cost optical reading and servo control methods and apparatus for single-track and simultaneous multi-track reading of an optical disk.

It is another object of this invention to provide multiple configurations of focusing and tracking methods and apparatus for optimal, accurate, and reliable information retrieval from an optical disk with single-track and multi-tracking reader heads.

It is another object of the current invention to miniaturize the illumination and detection sections in such a device for reading, focusing, and tracking by using microlasers and micro-scale photo detectors.

It is another object of this invention to provide optical reading methods and apparatus with expandable capacities in the illumination and detection sections so as to increase the number of optical data tracks being read simultaneously.

It is another object of this invention to provide the illumination and the detection sections of the optical reading methods and apparatus with synchronized mobility and alignment flexibility for single-track and multi-track reading by co-localizing the microlasers and detectors on a single microchip.

It is a further object of the current invention to simplify the optics of optical disk reader head for single-track and multi-track reading by using a single molded aspheric optical element as the object lens, therefore eliminating multiple beam splitters and mirrors.

These and other objects of the invention are accomplished in accordance with the principles of the invention by providing optical pickup and servo control systems and methods for digital data storage employed in apparatus capable of simultaneously reading multiple data tracks on optical disks.

One aspect of the invention includes an integrated array of independently excitable microlaser(s) and independently operative photo detectors. The arrays of lasers and detectors are aligned in multiple patterns within the integrated array on a unitary retaining member, which may be termed a Laser/Detector Block (LDB). Preferably, the invention advantageously provides a monolithic integration of laser and detector arrays on a single substrate of the LDB. This single substrate may comprise silicon. Another aspect of the invention includes a single optical element responsible for directing optical laser beams produced by the laser array onto an optical recording medium, such as an optical disk, and for projecting reflected optical data streams from the disk onto the detector array.

The preferred single optical element is a small angle beam splitter (SABS) that directs the source laser beams onto the surface of the object (specifically, the optical disk), and then shifts the reflected light in parallel away from the lasers and onto the neighboring detectors. The preferable embodiment for SABS is a molded aspheric split lens, a Bilens (BL), coated with an anti-reflection layer to enhance laser beam projection onto the optical disk and to maximize the collection of reflected light. Alternative configurations of the optics can comprise other prisms and/or diffraction gratings.

One of the alternative embodiments of the SABS is a Holographic Optical Element (HOE) inserted between the LDB and a first lens of the optical system. This element will serve as an equivalent to a Bilens if it covers half of a light beam reflected from an optical disk.

In one practice of the invention, the microlasers are Vertical Cavity Surface-Emitting Lasers (VCSELs) and the photo detectors are Resonance Cavity Photo Detectors (RCPDs). The VCSELs are independently addressable. Driving power for each VCSEL used here on the LDB is on the scale of about 1 mW, which is quite small for conventional VCSELs.

In a further aspect of the invention, the optical pickup and servo control system comprises the LDB, the BL, and an Electromechanical Servo (EMS) providing the automatic position adjustment of both LDB and BL along two directions in accordance with the error signals. The error signals refer to the tracking and focusing systems and are produced from responses of multiple detectors on the LDB. The total length of the optical head depends on the focal length of the BL only and can be made to be as little as 15–20 mm.

In accordance with the invention, the combined laser/detector array can be arranged in multiple configurations. In one configuration, the lasers and detectors are aligned serially interleaving each other, with focusing and tracking components flanking at the ends and/or being sandwiched in the middle of the array. In a second configuration, the laser/detector pairs are aligned side-by-side in parallel, with focusing and tracking components flanking at the ends and/or being sandwiched in the middle of the array. In yet another configuration, rows of laser and detector arrays interleave each other, forming a laser/detector pair matrix array with focusing and tracking components flanking at the ends and/or being sandwiched in the middle of the array.

In a further aspect of invention, the correction of optical magnification error in multi-track reading can be provided by the addition of more laser/detector pairs into the matrix array. Under this arrangement, a group of laser/detector pairs will be assigned to the same track. The neighboring lasers in each group as well as corresponding detectors have a small shift in a direction perpendicular to the track. With this, switching laser/detector pairs can produce a correction of optical magnification without a moving of the LDB (electronic correction).

The necessary number of additional laser/detector pairs is determined by the track position in the simultaneously detected group of tracks as well as by the tolerances of (i) the optical elements used, (ii) position of the elements in the LDB, (iii) track pitch on the disk. In accordance with the invention, the most compact disposition of multiple elements in the Laser/Detector Block can be achieved.

Also in accordance with the present invention, a first embodiment of the optical reader head is a compact and fast CD/DVD-ROM drive using one or three VCSELs and multiple RCPDs on the LDB and a single BL for single-track or double-track optical data reading. Multiple configurations of the focusing and tracking systems can be applied here for error correction.

In a second embodiment of the invention, a CD/DVD-ROM drive contains an optical reader head that includes a laser/detector array capable of simultaneously retrieving data from multiple adjacent tracks on an optical disk. Designs of the laser/detector array can be serial, parallel, or in a matrix format. The array resides on the LDB and is arranged in a similar fashion as above with a single BL to provide high capacity multi-track reading. Multiple configurations of the focusing and tracking systems are also applicable here for error correction.

In a third embodiment of the invention, multiples of the optical reader heads stated in the first two embodiments are arranged in serial or parallel array in CD/DVD jukeboxes.

In a fourth embodiment of the invention, certain microlasers in the laser/detector array are replaced with more powerful edge-emitting lasers. When supplied with a high power, these lasers function as recording heads, encoding data on optical storage media. When the power supply is turned to be equivalent to other microlasers in the array, these lasers act as reader heads, verifying and playing back the tracks written on the optical disk.

In a fifth embodiment of the invention, the optical pick-up system is packaged into a hand-held or wall-mountable reader/scanner for reading optically encoded wallet-size personal identification and medical history cards.

BRIEF DESCRIPTION OF THE DRAWINGS

In the accompanying drawings:

FIG. 8A is a diagrammatic representation of an alternative Laser/Detector Block according to the present invention employing a thermal resistor for monitoring temperature;

DESCRIPTION OF PREFERRED EMBODIMENTS

Figure 1A:
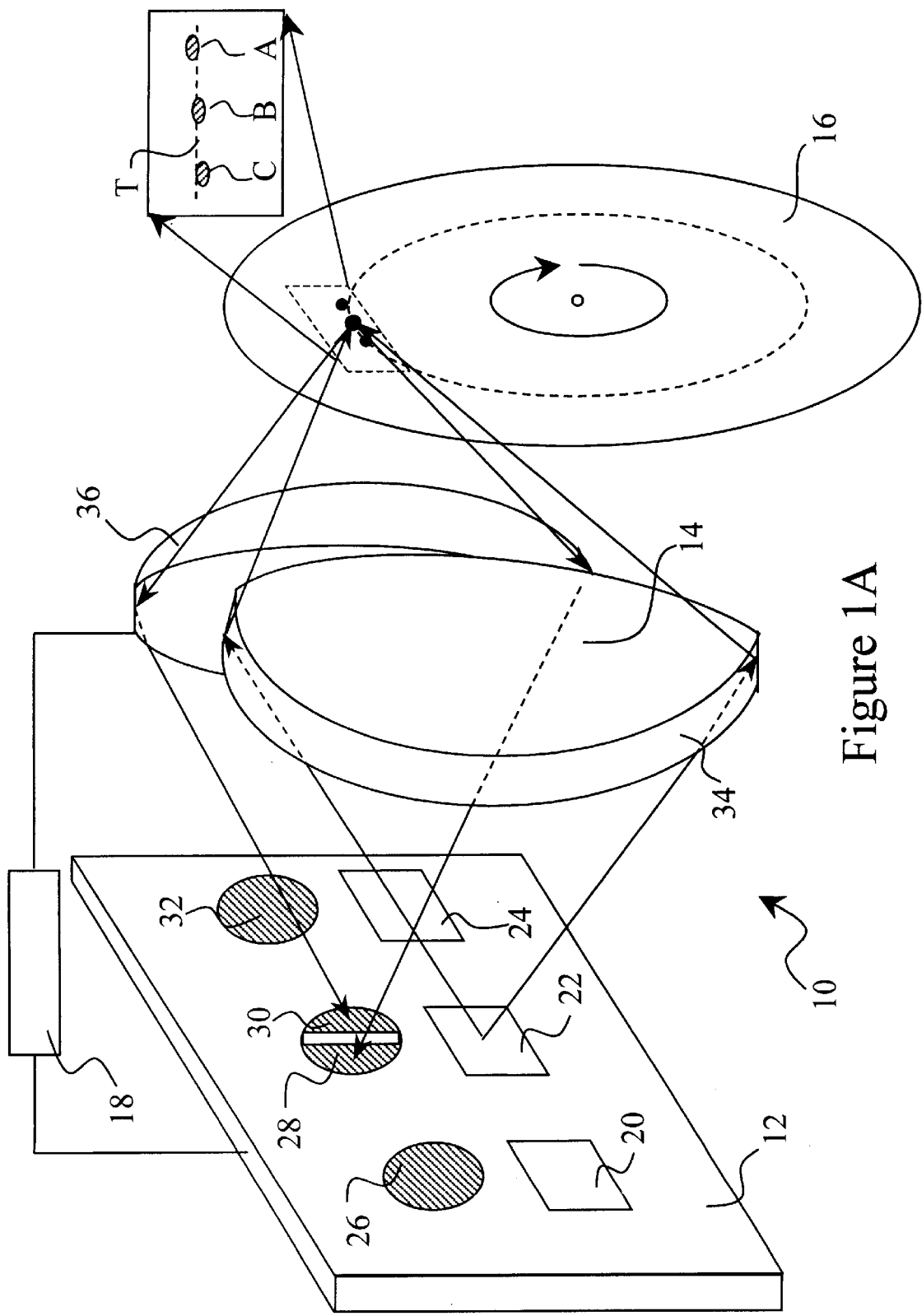
FIG. 1A is a diagrammatic perspective view of an Optical Pickup and Servo Control System according to the present invention.

Referring more particularly to the figures, a preferred Optical Pickup and Servo Control System 10 or, more simply, a data reading system 10 according to the present invention is indicated in FIG. 1A. From this and the remaining figures, one will see that the invention provides multiple configurations of the system 10 employing a single, unitary retaining member comprising a Laser/Detector Block (LDB 12) for integrated laser/detector diode arrays, a single Bilens (BL 14) for laser/detector optical congruency, and an Electromechanical Servo (EMS 18) for position adjustment of the LDB 12 and the BL 14.

One will appreciate that the small volume and light weight of the LDB 12 make it easily adjustable in position. This allows more versatile control of the optical alignment within the Optical Pickup and Servo Control System 10 to compensate for even severe vibration of the embodiment, instead of relying only on adjusting the optical components (mainly the object lens). Mobilizing the LDB 12 is particularly advantageous because the need for precise alignment for the LDB 12 is much softer than that for the optics. To further miniaturize the Optical Pickup and Servo Control System 10, the EMS 18 can also be integrated onto the same LDB 12 together with the control and amplification circuitry.

The Optical Pickup and Servo Control System 10 incorporates a single optical element, he BL 14, that channels laser beams for tracking and focusing error detection and data reading. With the application of the BL 14, the reflected optical data streams from the mirror-like surface of the Optical Disk (OD) 16 do not return back to the lasers. Instead, the BL 14 provides a small shift to the reflected beams, and directs them onto the photo detectors on the LDB 12. This design eliminates the complication of laser feedback, which is important in optical disk reader heads having very small distance between the laser and the disk. As further embodiments disclosed below will show, this invention also provides tracking and focusing methods and apparatus that employ single or triple sets of laser/detector pairs.

FIG. 1A demonstrates a simplified diagram of a parallel configuration of an Optical Pickup and Servo Control System 10, which is equally aptly termed in this specification an optical pick-up assembly 10, for tracking, focusing, and data reading constructed in accordance with the principles of the present invention. Three lasers 20, 22, 24 for generating optical beams are aligned along a single line on the LDB 12. The lasers 20, 22, and 24 may comprise Vertical Cavity Surface Emitting Lasers (VCSELs). Four detectors 26, 28, 30, 32, which may comprise Resonance Cavity Photo Detectors (RCPDs), are situated on an adjacent parallel line on the LDB 12 to detect light beams, which comprise optical data streams, reflected from an optical recording medium, such as the Optical Disk (OD) 16.

Figure 1B:
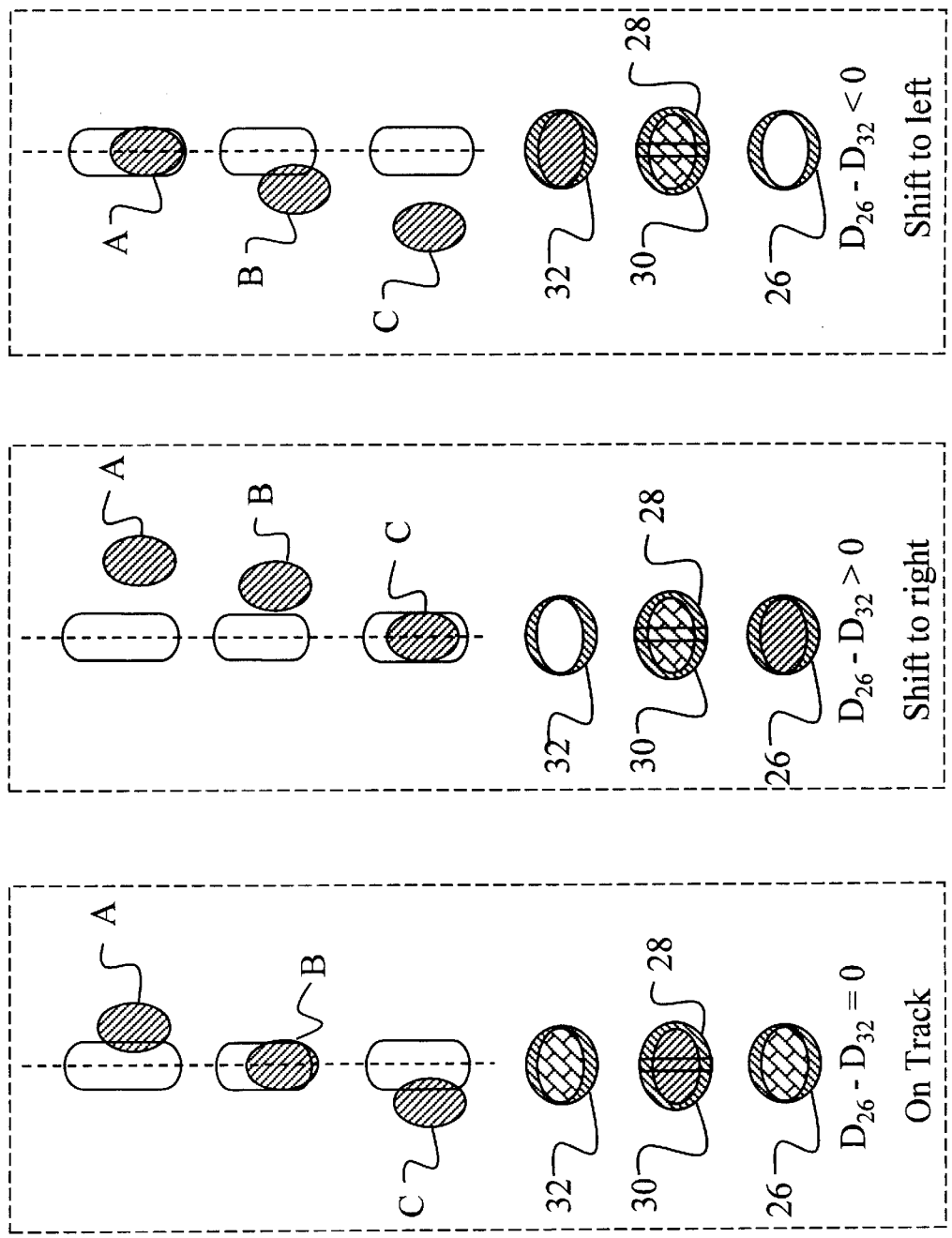
FIG. 1B is a diagrammatic representation of an outrigger tracking error detection arrangement according to the present invention shown on track, shifted to the right, and shifted to the left.
Figure 1C:
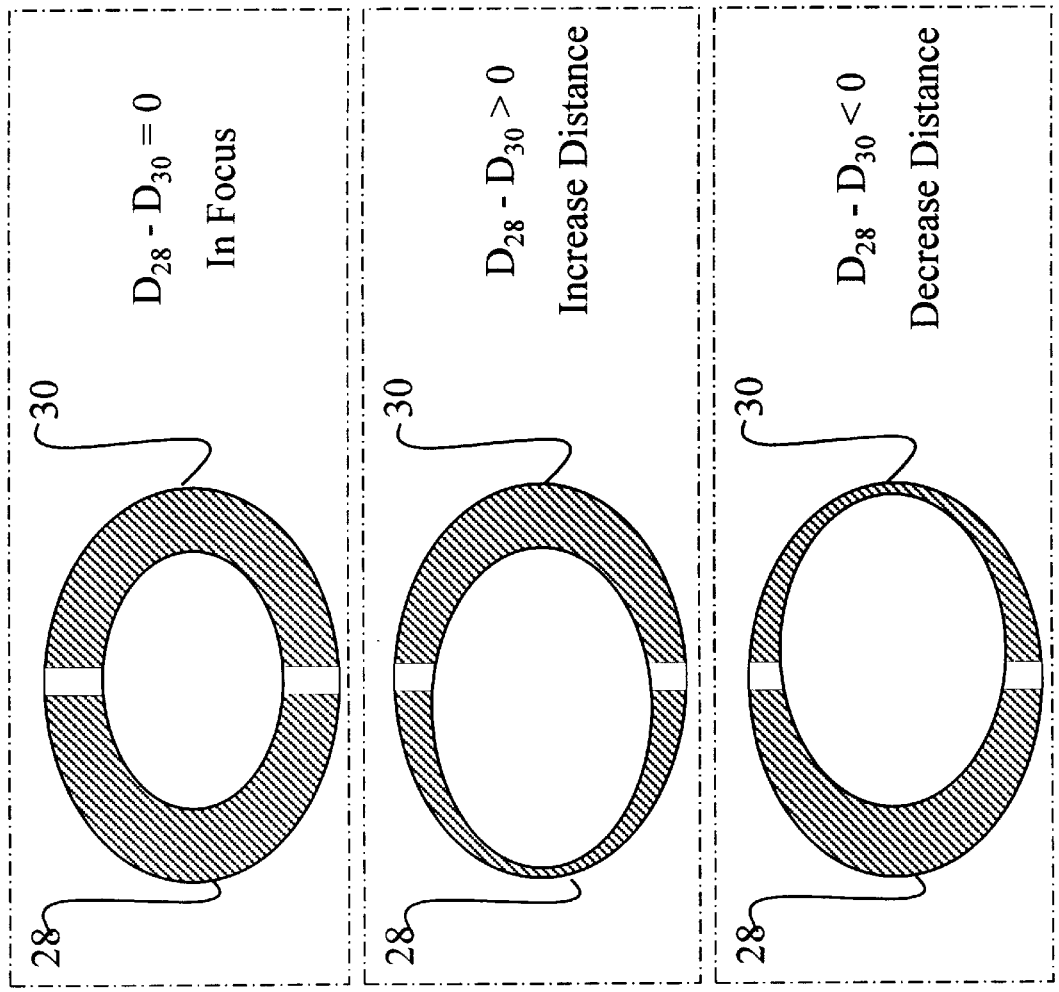
FIG. 1C is a diagrammatic representation of a focusing error detection arrangement according to the present invention shown in focus, too close, and too far.

Laser 22 and detectors 28 and 30 are used for focusing and reading, while lasers 20 and 24 pair up with detectors 26 and 32 respectively for tracking. The distances between neighboring elements on the LDB 12 are a few tens of □m, with the exact values depending on parameters of the BL 14. FIG. 1C shows that there is a very small gap (<1 $\mu$m) between detectors 28 and 30 to enhance focusing sensitivity. The combined aperture of detectors 28 and 30 equals the individual apertures of detectors 26 and 32, and is just a few tens of $\mu$m. The preferred embodiments of the invention disclosed herein advantageously provide a monolithic integration of the lasers 20, 22, and 24 and the detectors 26, 28, 30, and 32 on a single substrate, which comprises the LDB 12. In other words, the lasers 20, 22, and 24 and the detectors 26, 28, 30, and 32 are integrated onto a single microchip, the LDB 12, whereby the invention provides a uniquely compact, controllable, and reliably accurate means for retaining the lasers 20, 22, and 24 and the detectors 26, 28, 30, and 32 on a unitary retaining member, the LDB 12. The single substrate that comprises the LDB 12 may comprise silicon.

Referring again to FIG. 1A, the BL 14 is a molded aspheric lens that is split into a left half 34 and a right half 36 and rejoined with a vertical shift. The BL 14 advantageously acts both as a means for directing optical beams from the lasers 20, 22, and 24 onto the OD 16 and as a means for projecting reflected optical data streams onto the detectors 26, 28, 30, and 32. It has a large numerical aperture (approximately 0.5) that is capable of converging incident laser beams into very tiny focal spots onto the surface of the OD 16. The aspheric shape of the BL 14 compensates for any optical aberrations, thus helping to achieve diffraction limits of the focal spots A, B, and C. A diffraction grating (not shown) may be added onto the aspheric surface of the BL 14, compensating for further changes in the BL 14 caused by temperature variations.

The vertical shift between the two halves of the BL 14 corresponds to the vertical displacement of the laser array 20, 22, 24 and the detector array 26, 28, 30, 32 on the LDB 12. Source laser beams pass through only the left half 34 of the BL 14. The right half 36 of the BL 14 collects only the reflected beams from the OD 16 and directs them to their corresponding detectors 26, 28, 30, or 32. That is, detectors 26 and 32 receive beams originating from lasers 20 and 24 respectively, while detectors 28 and 30 both receive light from laser 22. No reflected light from the OD 16 goes back to lasers 20, 22, and 24. The larger aperture of the half 34 of the BL 14 along the direction of the split stresses the beam spot B in the direction perpendicular to the running of the track T, resulting in a preferred elongation of the spot B along the track T.

Therefore, the BL 14 provides the necessary differentiation between reflected beams and emitted beams, so that only reflected beams are registered on the detectors 26, 28, 30 and 32. This prevents laser power output from becoming unstable due to laser feedback, a phenomenon that increases laser output power through increased reflectance back to the emitting laser when the distance between the laser and the object is less than the coherent length of the laser (usually a few centimeters). Laser feedback can induce errors in tracking and focusing control and data reading, rendering the entire pick-up assembly 10 unstable. Therefore, preventing laser feedback is important in small optical reader heads, and is conventionally achieved through the implementation of complicated optical elements. It is obvious that the inherent properties of the BL 14 here in this invention provide the same effect in laser feedback reduction as the more conventional half-aperture method, but without additional optical components, reducing both unit volume and manufacturing cost.

To achieve tracking and focusing error detection, an Electromechanical Servo (EMS) 18 is incorporated into the optical pick-up assembly 10 in FIG. 1A. A tracking signal is generated by displacing the LDB 12 minutely so that the side beams hit the two edges of the track T ahead of and after the main beam spot B. Referring to FIG. 1B, in the case of optimal tracking, main beam spot B is centered on track T, with side spots A and C about 20 $\mu$m ahead of and after the spot B and about 0.5 $\mu$m left and right to the center of the track T. This outrigger tracking arrangement uses the side spot detectors 26 and 32 to send output voltages to a differential amplifier (not shown), which then generates a tracking error signal measured as (D26−D32). When the signal is zero, the main beam spot B is on track; it is off to the right when the signal is positive, and it is off to the left when the signal is negative.

Half-aperture collection of reflected light by the BL 14 allows half-aperture focusing, where the output voltages of detectors 28 and 30 are evaluated by another differential amplifier (not shown) to calculate (D28−D30) as the focusing error signal. Referring to FIG. 1C, this focusing error signal is zero when the distance between the BL 14 and the OD 16 is proper; it is positive when the distance is more than necessary, and negative when the two elements are too close to each other. Both the tracking error signal (D26−D32) and the focusing error signal (D28−D30) are fed back as servo control signals to the EMS 18. In accordance to these two error signals, the EMS 18 utilizes a dual-axis (one along the radius of the OD 16 and another along the optical axis of the BL 14) actuator (not shown) to calibrate the exact positions of the LDB 12 and the BL 14. Meanwhile, a summary signal (D28+D30) serves as a data signal for data reading.

Figure 2A:
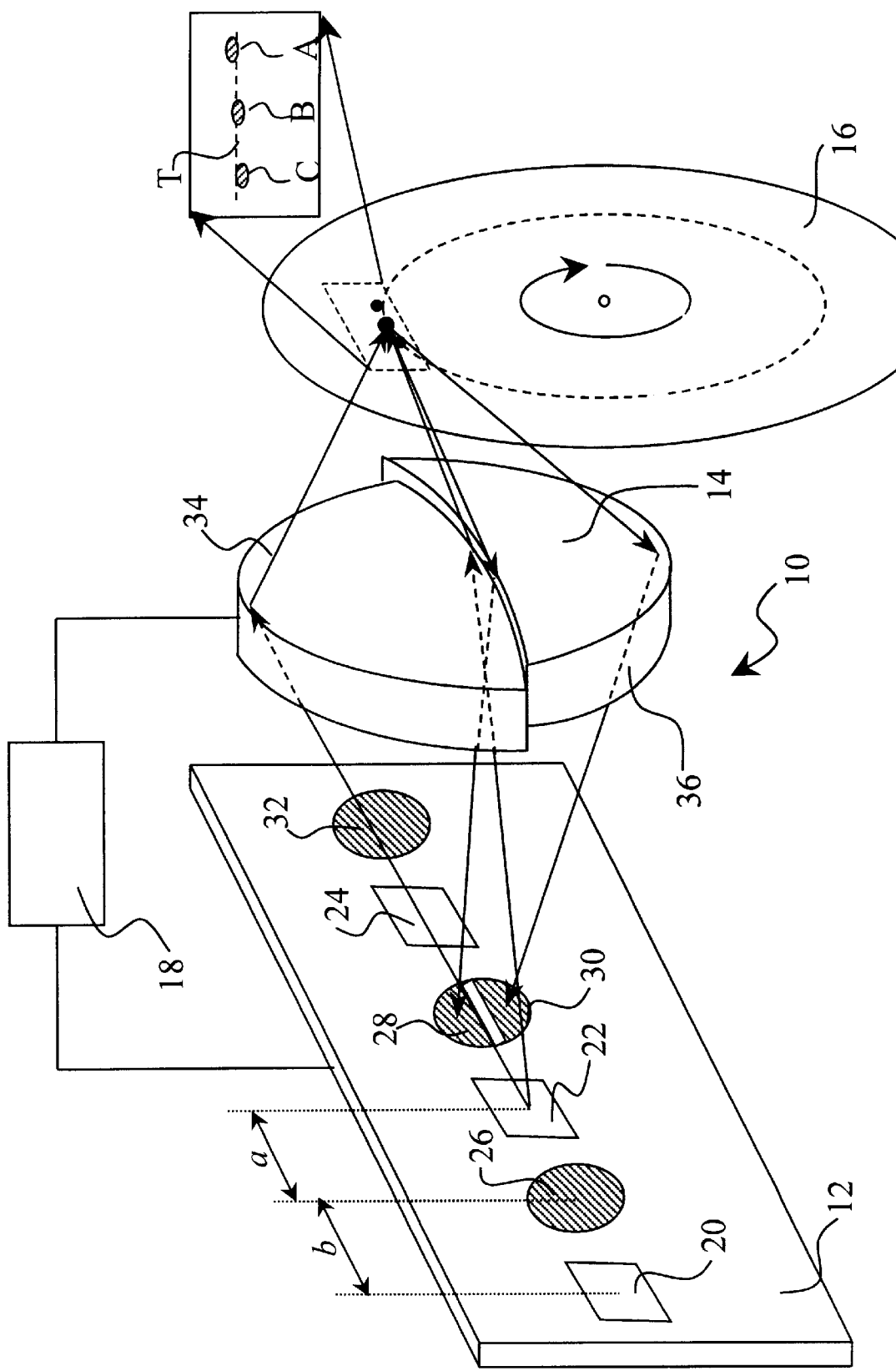
FIG. 2A is a diagrammatic perspective view of an alternative embodiment of an Optical Pickup and Servo Control System according to the present invention.

Referring to FIG. 2A, an alternative serial configuration of the optical pick-up assembly 10 for tracking, focusing, and reading is presented. In this design, lasers 20, 22, and 24 and detectors 26 and 32 are arranged serially on a single line interleaving each other, except for detectors 28 and 30, the line through which is perpendicular to the line through the other elements. Detectors 26 and 32 receive the reflected beams originating from lasers 20 and 24 respectively for tracking, while detectors 28 and 30 both receive reflected beams from laser 22 for focusing and reading. The spacing a between adjacent laser/detector pairs is wider than the spacing b within pair to prevent cross talk and laser feedback. The exact distances a and b depend on, among other parameters, the shift between the two halves 34 and 36 of the BL 14. In contrast to FIG. 1A, the BL 14 shown here in FIG. 2A is rotated 90° along its optical axis. The rotation is to match the shift between the upper half 34 and lower half 36 of the BL 14 with the shift between the laser array and the detector array on the LDB 12. Through this modification, the reflected beams from lasers 20, 22, and 24 are appropriately guided and precisely registered only onto the respective detectors 26, 28, 30, and 32.

Incidentally, the between-pair spacing a is predetermined to be about 100 μm for the purpose of tracking. This limits the within-pair spacing b to be very short, which in turn limits the choice of detectors. That is, the close proximity between the lasers 20, 22, and 24 and detectors 26, 28, 30, and 32 again demands that the detectors 26, 28, 30, and 32 be fabricated with the same material as the lasers 20, 22, and 24 on the LDB 12. As such, the invention provides a monolithic integration of the lasers 20, 22, and 24 and the detectors 26, 28, 30, and 32 in a single substrate, which comprises the LDB 12. Again, this single substrate may comprise silicon.

Specific for this invention, only RCPDs can be paired with VCSELs for such a serial configuration. Additionally, the distance between the foci of the two halves 34 and 36 of the BL 14 has to be very small to accommodate the small shift of light from the lasers 20, 22, and 24 to their corresponding detectors 26, 28, 30, and 32. These limitations certainly impose technical difficulties on the design, production, and packaging of the elements, and restrict the application of this laser/detector interleaving layout.

Figure 2B:
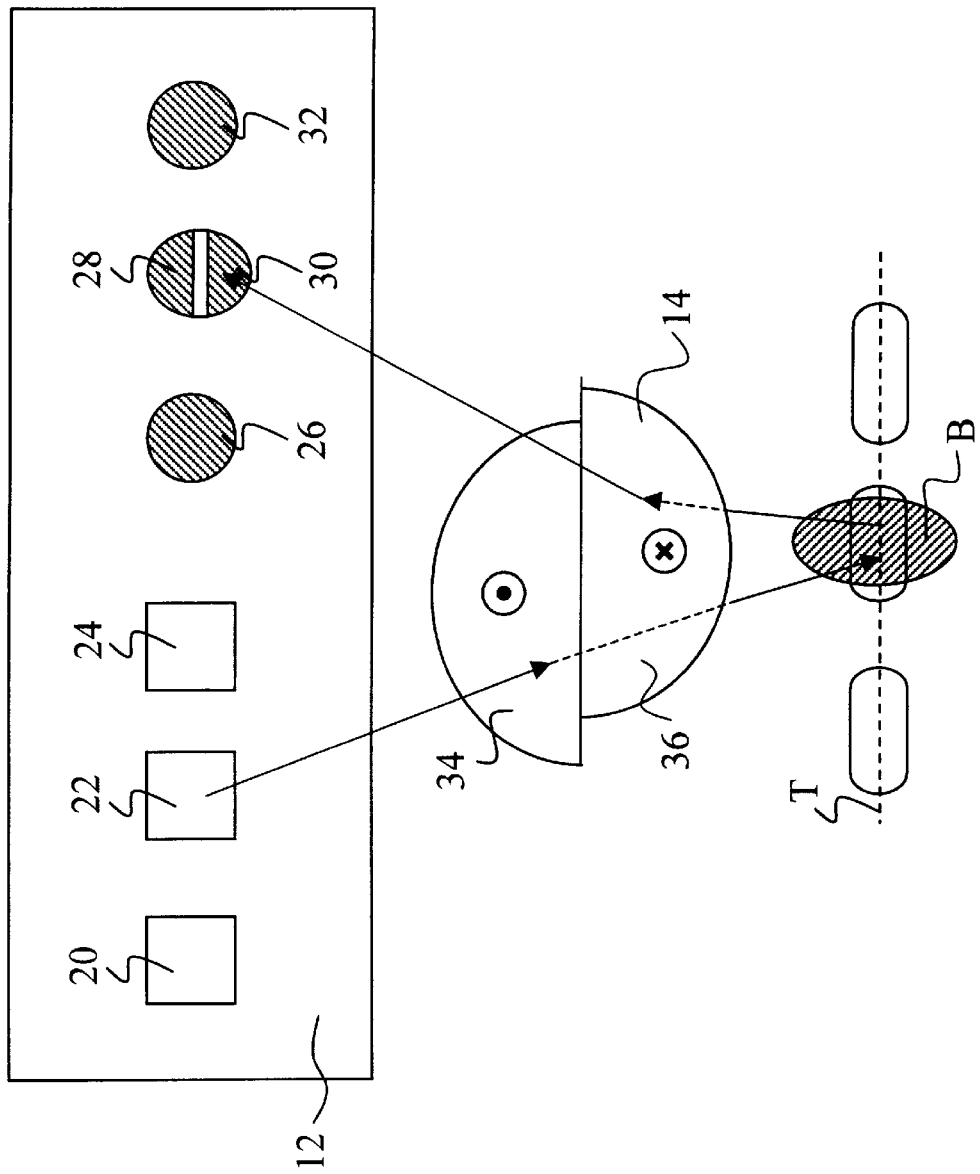
FIG. 2B is a diagrammatic representation of an alternative of a serial configuration of a Laser/Detector Block according to the present invention.

To eliminate the aforementioned limitations, a preferred alternative of the serial configuration of the LDB 12 is demonstrated in FIG. 2B. In this case, the laser array is configured separately from the detector array. This separation allows the detectors 26, 28, 30, and 32 to be built from a different material than the lasers 20, 22, and 24, thus providing the detectors 26, 28, 30, and 32 with independence from the lasers 20, 22, and 24 for selection and modification. The separation between the laser array and the detector array also alleviates the fabrication stringency imposed on the BL 14 for small foci distance between the halves 34 and 36. However, the larger aperture of the half 34 of the BL 14 along the direction of the split stresses the main beam spot B along the direction of the track T, resulting in undesired widening of the main spot B perpendicular to the track T.

Figure 3A:
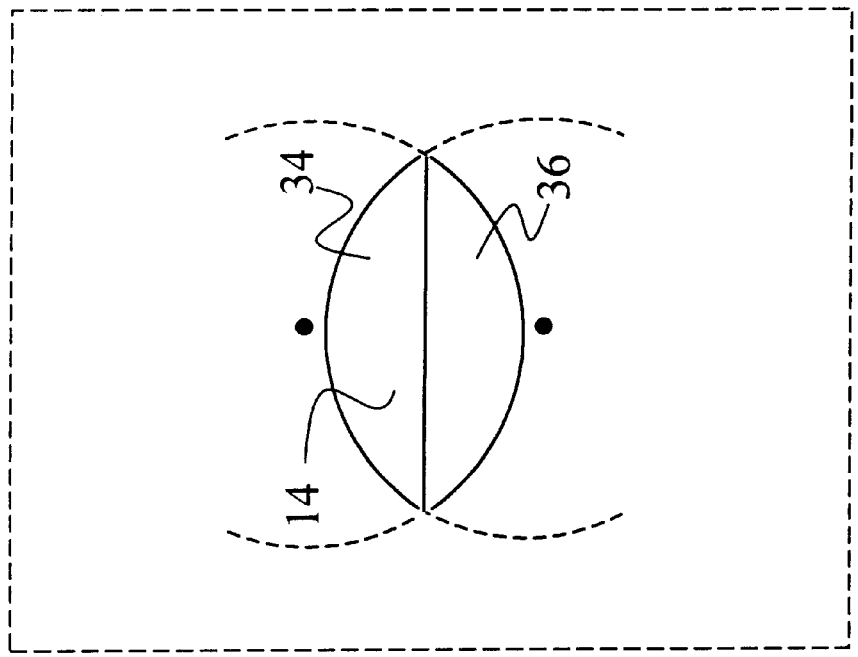
FIG. 3A is a diagrammatic representation of alternative bilenses according to the present invention.
Figure 3A:
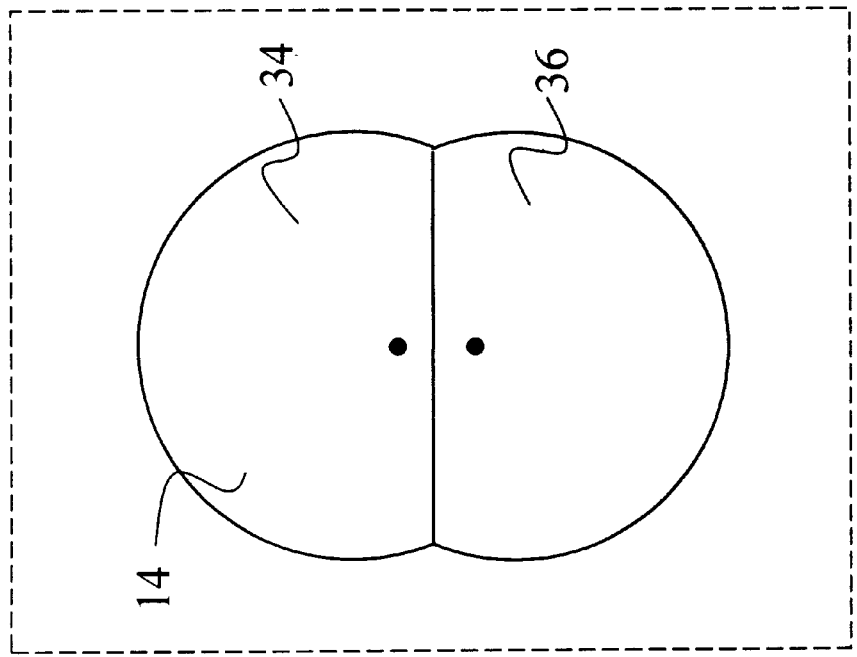
Figure 3B:
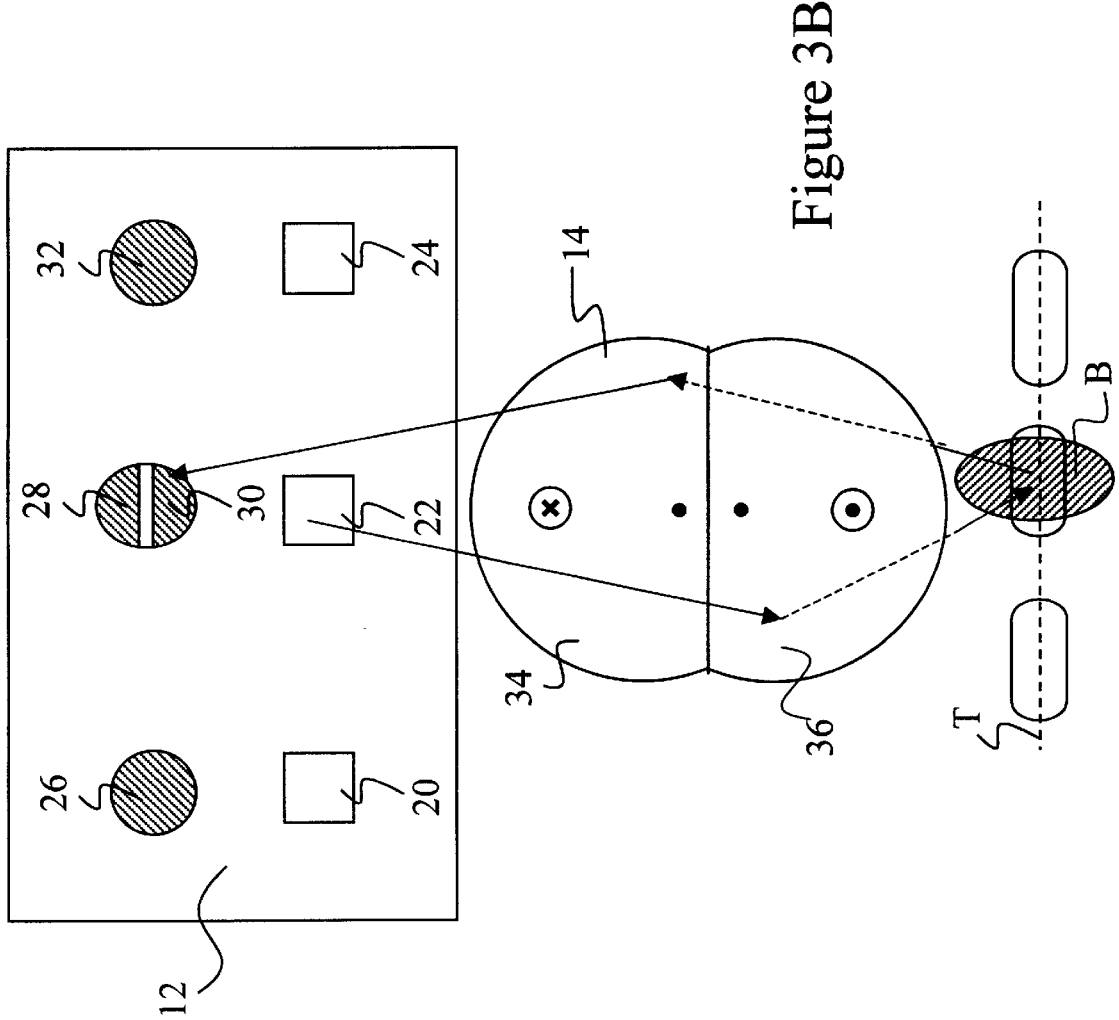
FIG. 3B is a diagrammatic representation of an alternative of a parallel configuration of a Laser/Detector Block according to the present invention.
Figure 3C:
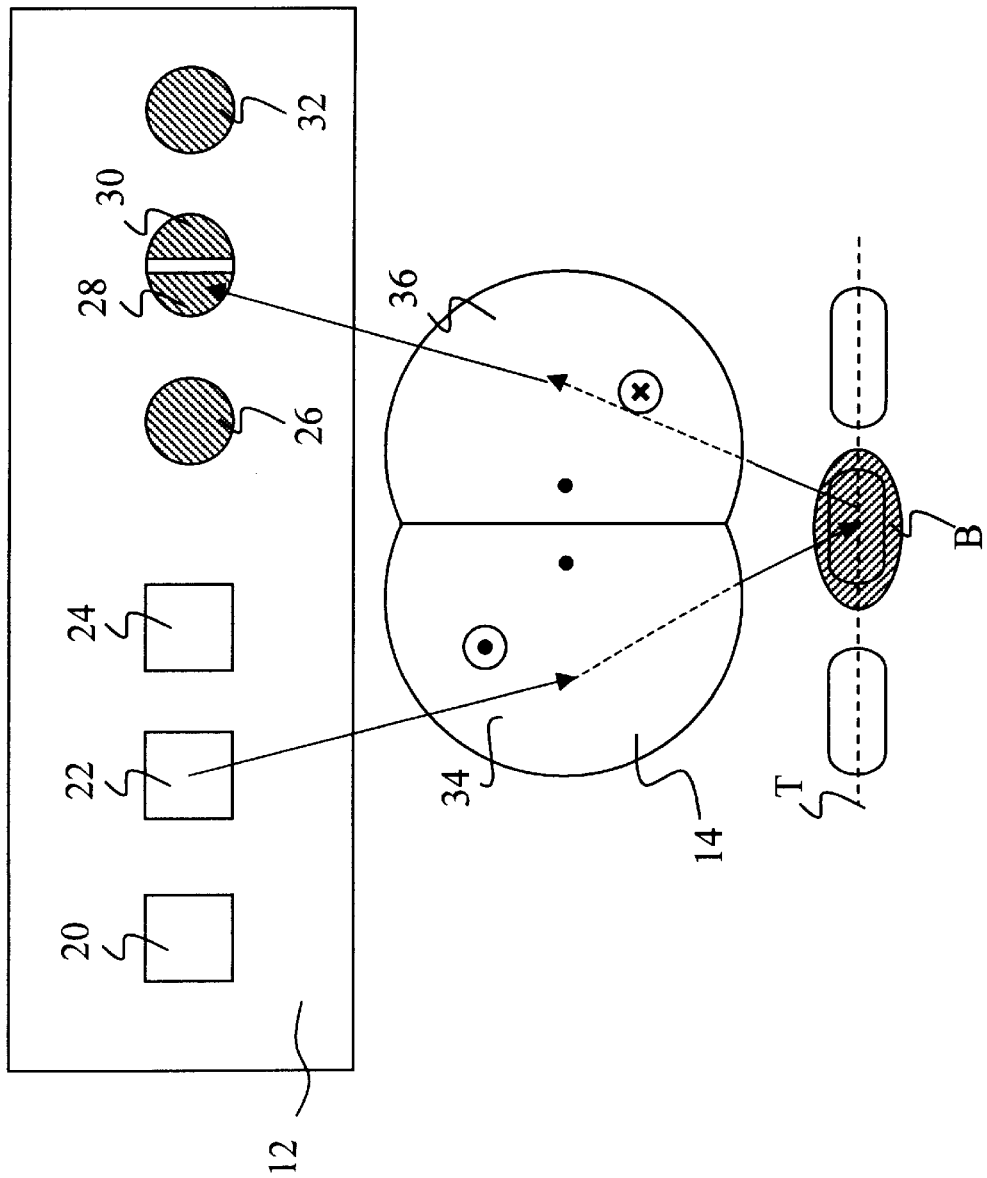
FIG. 3C is a diagrammatic representation of a preferred alternative of a serial configuration of a Laser/Detector Block according to the present invention.

Referring to FIG. 3A, two more BL 14 are illustrated. Both designs are also molded aspheric, lighter, simpler, and cheaper to manufacture than conventional optics that offer similar optical properties. They are valid and practical alternatives to the BL 14 shown in FIG. 1A, thus applicable in any and all configurations described in this invention. To incorporate these designs into the present invention, the laser/detector layout on the LDB 12 would need appropriate modification. The main alteration resides in the arrangement of the two detectors 28 and 30 for focusing and reading. Specifically, a suitable parallel configuration is shown in FIG. 3B. Here, detectors 28 and 30 are on a line perpendicular to the line through detectors 26 and 32 and the line through all three lasers 20, 22, and 24. In any and all serial configurations involving the alternative BL 14, all lasers and detectors are linearly arranged. The separated array pattern in FIG. 3C is most preferred. This layout results in the desired elongation of the main beam spot B along, rather than perpendicular to, the track T, as in FIG. 3B. It also eliminates the aforementioned limitations involving the interleaving pattern in FIG. 2A.

Figure 4A:
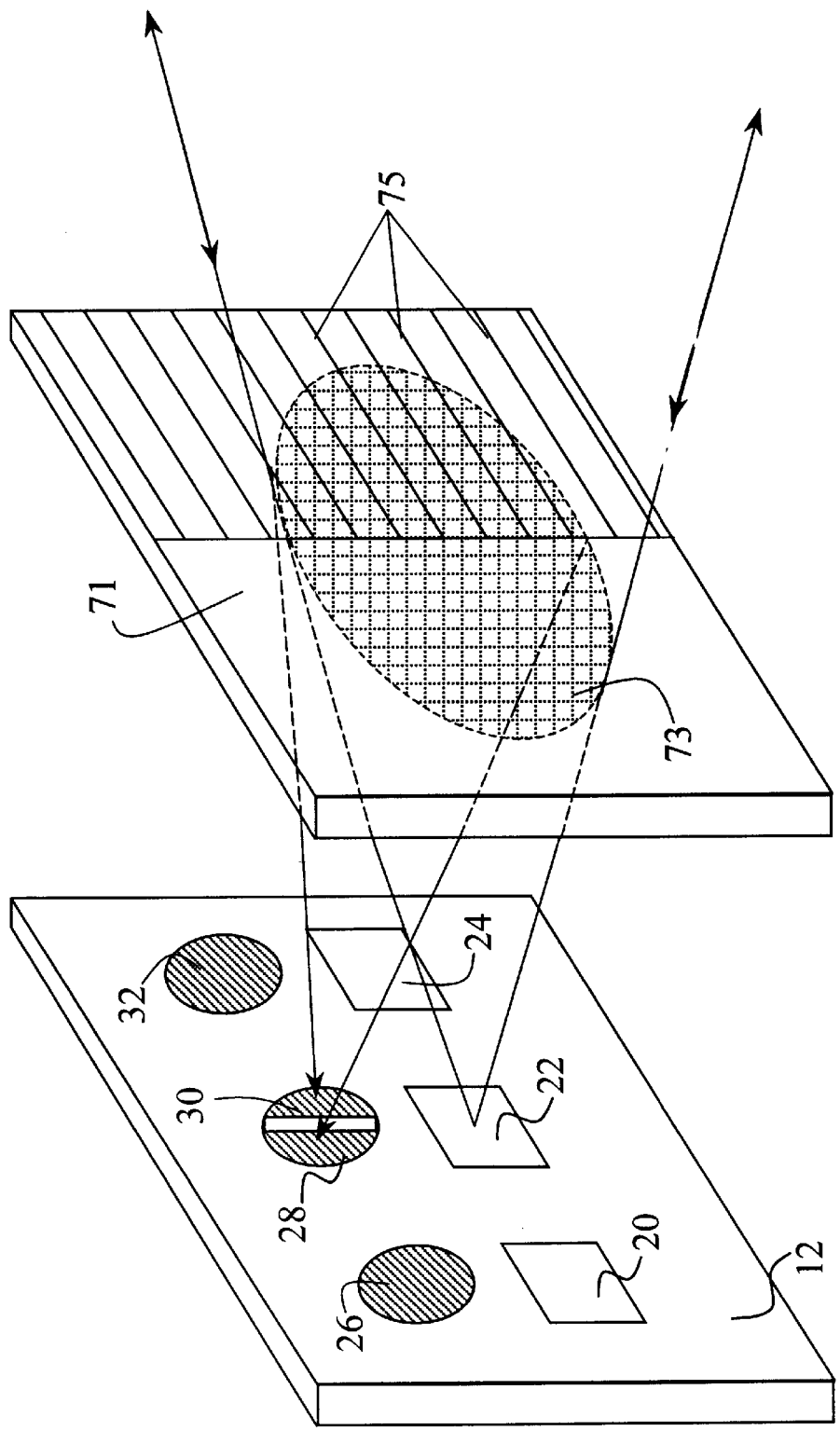
FIG. 4A is a diagrammatic perspective view of an alternative, single-laser Laser/Detector Block according to the present invention.

FIG. 4A depicts an alternative design of a Small Angle Beam Splitter (SABS) to the previously described Bilens-based configuration. The light emitted by the lasers 20, 22, 24 and returned back to the LDB 12 after the reflection from the disk OD should be shifted in the plane of the LDB 12 to meet detectors 26, 28, 30, 32. To provide this, a Holographic Optical Element (HOE) 71 is installed in front of LDB. In this case, the remaining part of the optical system contains conventional lenses (not shown) providing the focusing of laser light on the optical disk (not shown).

The light reflected from the disk OD and passing back through the optical system is partly deflected by HOE 71 from its original direction due to the diffraction exacted by the HOE structure. The light is then focused on the detectors 26, 28, 30, 32 of the LDB. Several embodiments of a HOE can be used in the proposed design with the particular embodiment depending on the required number of diffraction orders provided by the HOE and the energy distribution between them, as well as on the spatial shift between lasers 20, 22, 24 and detectors 26, 28, 30, and 32 on the LDB. The HOE can be used with all embodiments of the LDB presented in this invention.

FIG. 4A shows the HOE embodiment, which is inserted in the previously described optical pickup system, performing the function of the Bilens shown in FIG. 1A. The LDB in both FIG. 4A and FIG. 1A is designed to provide for single-track reading and for the detection of servo control signals. The HOE 71 depicted in FIG. 4A contains a diffractive pattern 75 on the half of its clear aperture 73. Therefore, the HOE 71 deflects only the half section of the returned beam thereby allowing a half-aperture method of focusing correction. The differential signal from the detectors 28 and 30 is used as a focusing error (see FIG. 1C), and the difference between signals from detectors 26 and 32 is the tracking error (FIG. 1B).

Figure 4B:
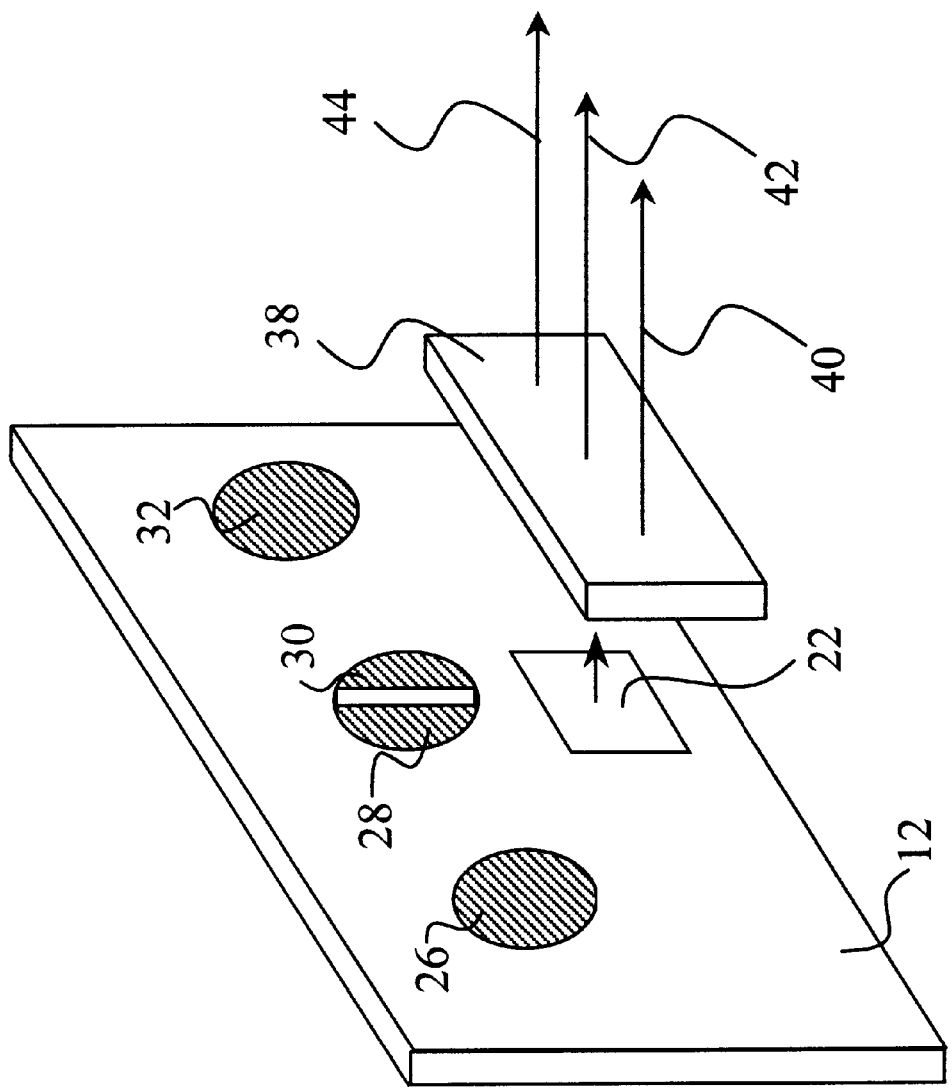
FIG. 4B is a diagrammatic perspective view of a fragment of an alternative Small Angle Beam Splitter of an Optical Pickup and Servo Control System according to the present invention.

Referring to FIG. 4B, an alternative to the previously described triple-laser configuration is demonstrated. In this design, only laser 22 is applied in place of all three lasers 20, 22, and 24 in FIG. 1A. A diffraction grating 38 covers the surface laser 22 to split the single laser beam into three individual beams 40, 42, and 44. Side beams 40 and 44 are for the outrigger tracking, while main beam 42 in the center is used for both focusing and data reading. The operating principles for tracking, focusing, and reading here are identical to that described in FIG. 1A. All servo control and data signals are processed in the same fashion: (D26–D32) for tracking error, (D28–D30) for focusing error, and (D28+D30) for reading data. In general, this beam splitting design using the combination of a single laser 22 and a diffraction grating 38 is an alternative to any and all triple-laser configurations stated in this invention.

Figure 5A:
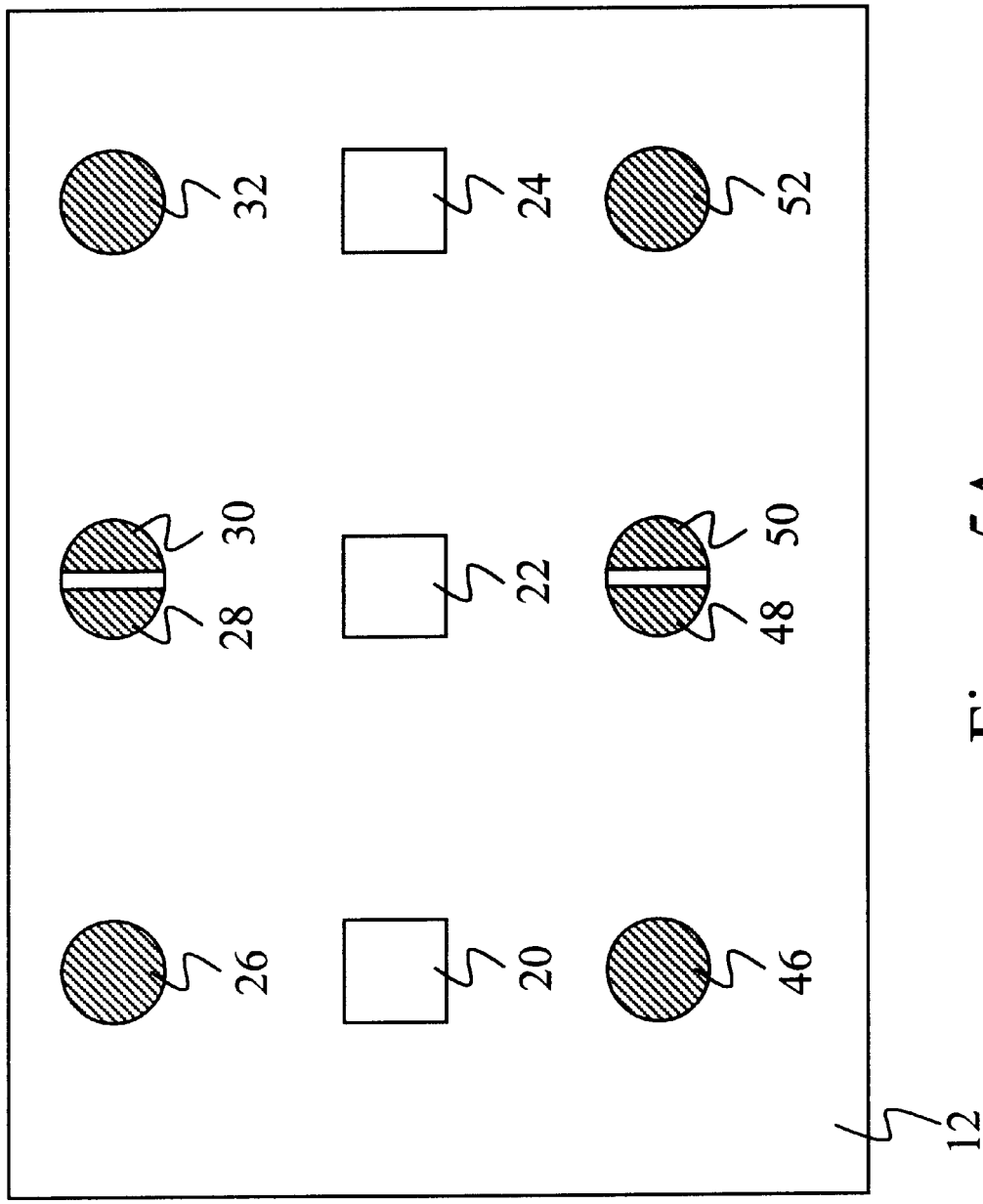
FIG. 5A is a diagrammatic representation of another parallel configuration of a Laser/Detector Block for dual beam spots detection according to the present invention.
Figure 5B:
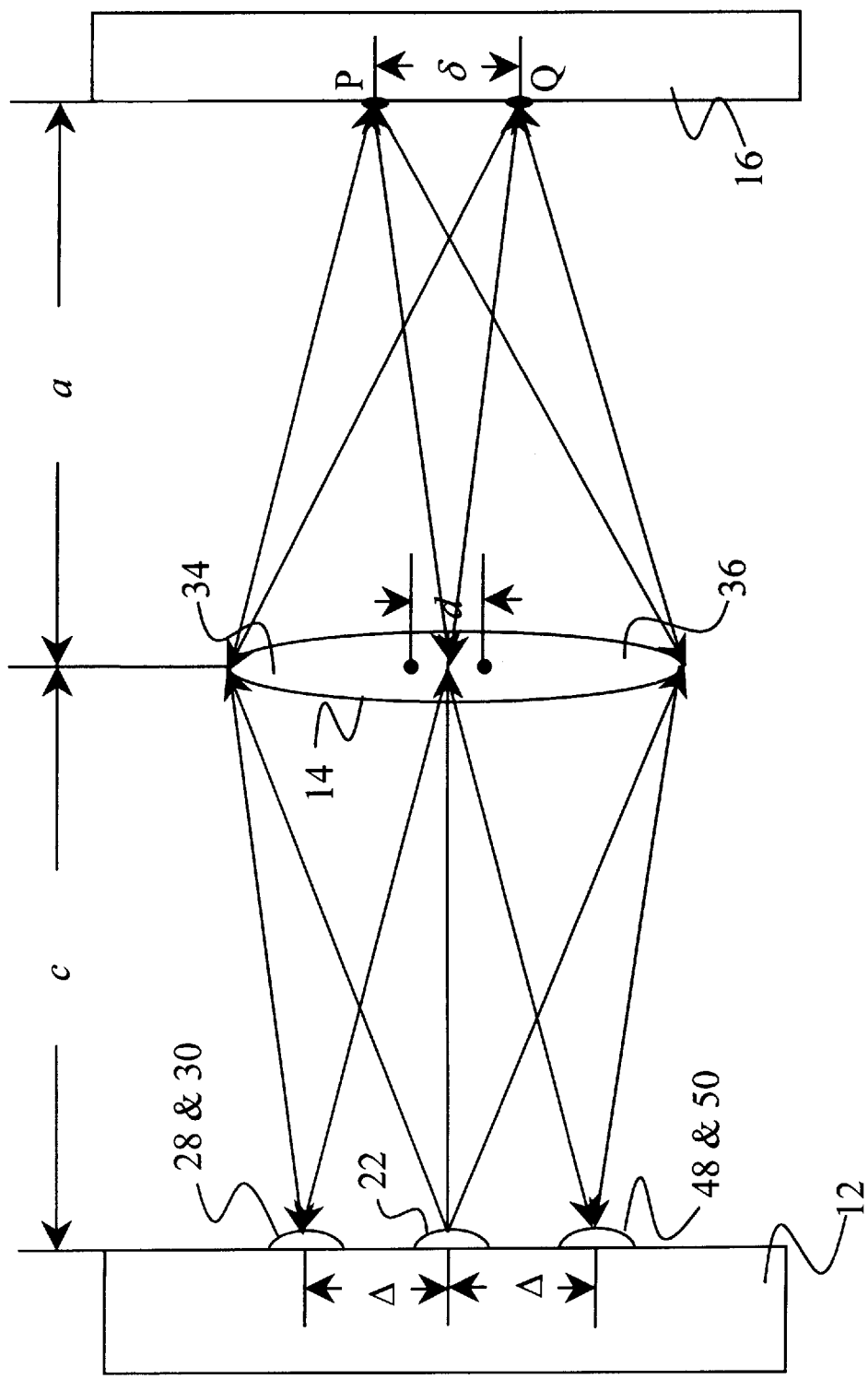
FIG. 5B is a diagrammatic representation in side elevation of the operation of an Optical Pickup and Servo Control System according to FIG. 5A.

Referring to FIG. 5A, a preferred alternative laser/detector parallel configuration is shown. In this layout, the LDB 12 contains three lasers 20, 22, and 24 and eight detectors 26, 28, 30, 32, 46, 48, 50, and 52. This design is capable of reading two data points on two different, preferably adjacent, tracks T1 and T2 simultaneously. As illustrated in FIG. 5B, the main beam from laser 22 passes through both halves 34 and 36 of the BL 14 and forms two main beam spots P and Q on the OD 16. The two reflected main beams go through both halves 34 and 36 of the BL 14 and project onto detectors 28, 30 and 48, 50. In the same fashion (not shown), lasers 20 and 24 each generates two side beam spots on the OD 16, and the reflected side beams are projected onto detectors 26, 46 and 32, 52 respectively. Tracking is controlled by signal [(D26−D32)+(D46−D52)], and focusing by signal [(D28−D30)+(D48−D50)]. The two reading signals from the two different tracks T1 and T2 are (D28+D30) and (D48+D50), respectively. The resulting tracking and focusing controls are enhanced because the error signals are amplified through summation, thus improving the detection limits.

Figure 5C:
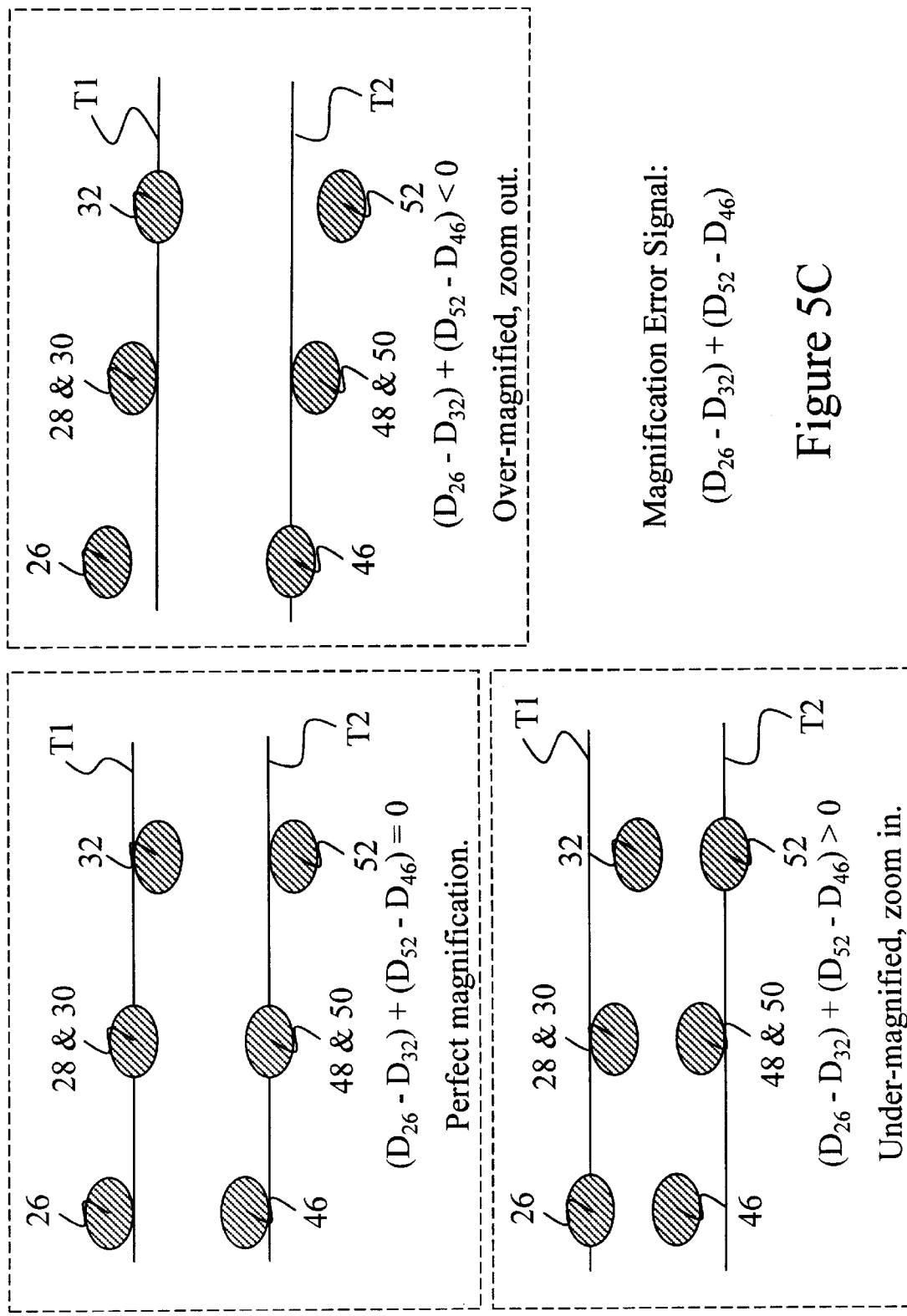
FIG. 5C is a diagrammatic representation of a magnification error detection arrangement according to the embodiment of the invention shown in FIGS. 5A and 5B.

In addition to the tracking and focusing servo controls, the dual-track reading design in FIG. 5A requires magnification servo control as well. Manufacturing tolerance, temperature changes, component aging, and track pitch variation on the OD 16 can cause significant magnification errors. The common result is misalignment of the reflected beams with the sensor elements on the LDB 12, leading to faulty data reading. Magnification factor of this optical pick-up assembly 10 is the ratio of the spread between the reflected beam spots on the detectors to the spread between the projected beam spots P and Q on the OD 16. Appropriate magnification matches the spacing between the main beam spots P and Q with the spacing between the target tracks T1 and T2, and with the spacing between detectors 28, 30 and 48, 50. Incorrect magnification can be easily detected by a pair of differential amplifiers (not shown) using the output voltages from detectors 26, 32, 46, and 52, generating a magnification servo signal [(D26−D32)+(D52−D48)], as illustrated in FIG. 5C. When magnification is perfect, the servo signal equals 0, and no adjustment is necessary. A positive error signal indicates insufficient magnification, and is fed back for zooming-in; while a negative error signal triggers out-zooming to correct for excessive magnification. Changes in magnification are achieved through the adjustment of either the LDB 12, or the optics including the BL 14, or both. The compact size and mobility of the LDB 12 and the BL 14 make the adjustment process for magnification errors simple and fast.

Referring to FIG. 5B again, major parameters within this dual-track optical pick-up assembly 10 are detailed. $\Delta$ is the distance between the line of lasers 20, 22, and 24 to the line of detectors 26, 28, 30, and 32, and to the line of detectors 46, 48, 50, and 52. $\square$ is the distance between the main beam spots P and Q on the OD 16. c is the distance between the LDB 12 and the BL 14, a being the distance between the BL 14 and the OD 16, and d being the distance between two foci of the split halves 34 and 36 of the BL 14. The magnification factor is designated as M, and the BL 14 focal length as $f_0$. a should be much shorter (<20%) than c. When a, c and $\delta$ are preset, the other parameters can be calculated from the following equations:

$$M = c/a$$

$$f_0 = aM/(M+1)$$

$$d = \delta M/(M+1)$$

$$\Delta = \delta M$$

Because c is more than five (5) times larger than a, M is greater than five (5), making $f_0$ almost equal to a, d almost equal to $\delta$, and $\Delta$ much longer than $\delta$.

Figure 6A:
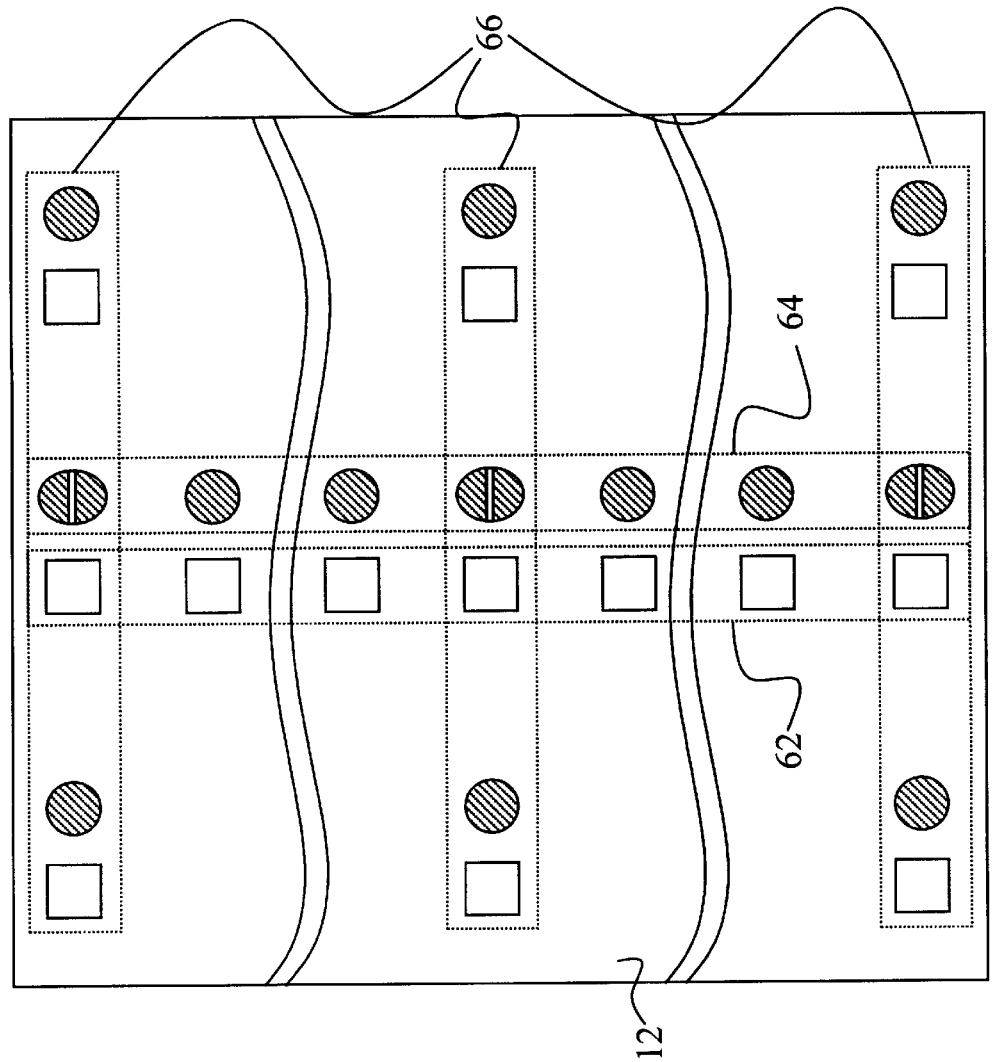
FIG. 6A is a diagrammatic representation of an arrangement of a Laser/Detector Block according to the present invention with a multi-track laser/detector array.

Referring to FIG. 6A, an arrangement of a multi-track optical pick-up laser/detector array on the LDB 12 is shown. In this particular layout, a multi-track reader laser/detector array is incorporated onto the LDB 12. A linear laser array 62 and a linear detector array 64 are positioned on two parallel lines, with each laser pairing up with its adjacent detector. The serial configuration of tracking and focusing servo control elements 66 and the design and the orientation of the BL 14 described in FIG. 2A are adopted here. With such an arrangement, the shift between lasers and their corresponding detectors matches with the direction of shift between the split halves 34 and 36 of the BL 14. Multiple sets of servo control elements 66 are placed at the ends and in the middle of the multi-track reader array, so that the error signals are weighed and summed up to provide optimal error correction for the data reading of all tracks. The principle of magnification servo control illustrated in FIG. 5B is incorporated here using the output voltages from the multiple sets of tracking control elements. It is obvious that the linear laser array 62 and the linear detector array 64 can be expanded beyond the present demonstration to afford the capability of reading many more tracks simultaneously.

Figure 6B:
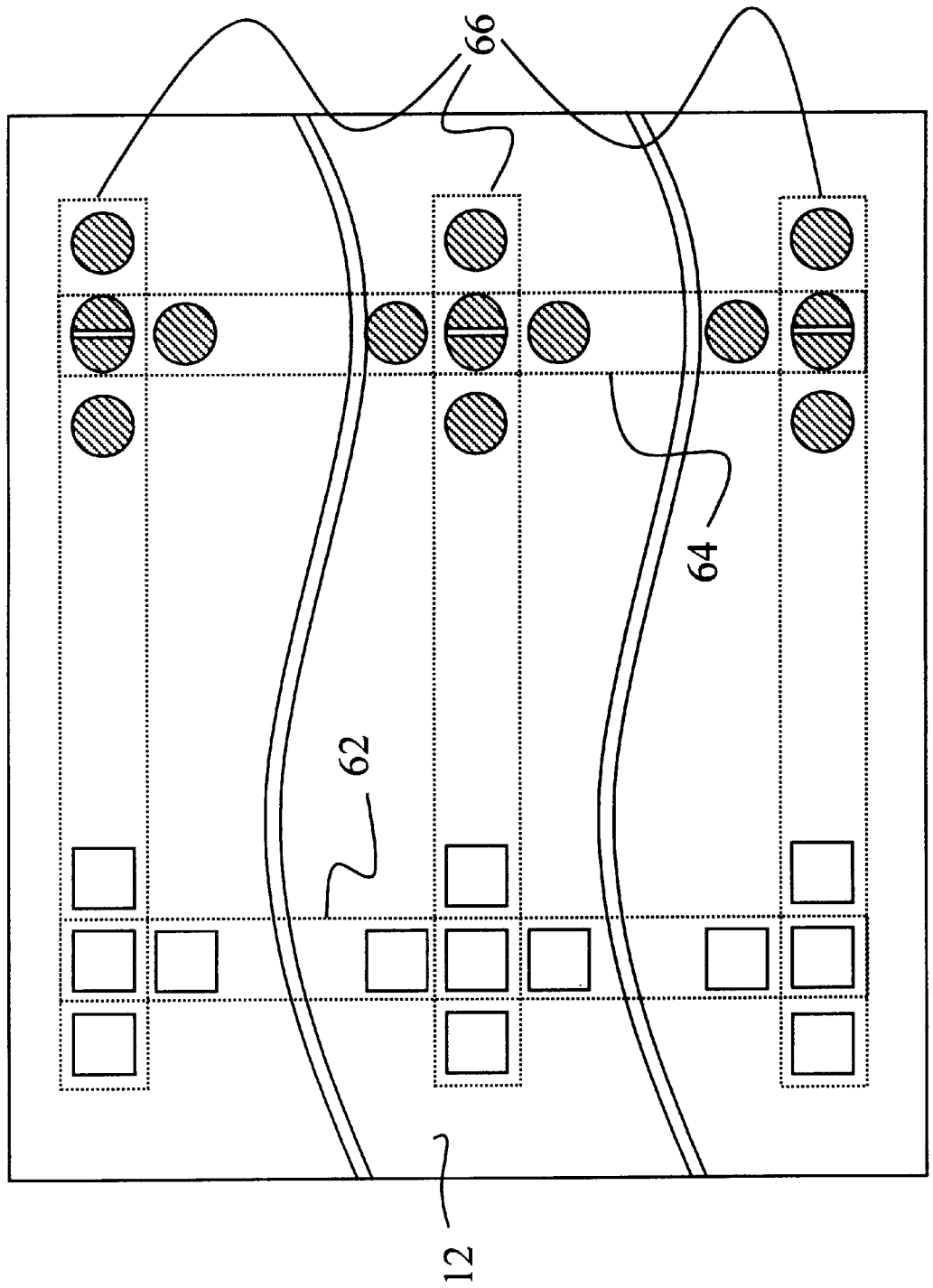
FIG. 6B is a diagrammatic representation of another arrangement of a Laser/Detector Block according to the present invention with a multi-track laser/detector array.

Because of the inherent limitations within the design of FIG. 2A, it is necessary to adjust the distances between adjacent elements on the LDB 12 according to the parameters of the BL 14 to prevent cross talk and laser feedback. Another configuration that addresses these problems, effectively making it a more practical and thus preferred alternative, is illustrated in FIG. 6B. The most prominent difference that distinguishes this configuration from the one in FIG. 6A is that the laser array 62 here is completely separated out from the detector array 64 and placed parallel to the latter, rather than having the two arrays interleaving each other. While the laser array 62 and the detector array 64 for data reading are still arranged in parallel, the choices of the BL 14 and the tracking, focusing, and magnification servo control elements 66 are the ones in FIG. 3C. As mentioned above, this division between the laser array 62 and the detector array 64 allows for independent modification of the two arrays, thereby providing the optical pick-up assembly 10 with maximum flexibility and adaptability. It also eliminates the need for small foci distance within the BL 14. The BL 14 and the tracking and focusing servo control layout in FIG. 2B can be adopted here as well, provided that the widening of the beam spot B perpendicular to the track T is tolerable.

Figure 6C:
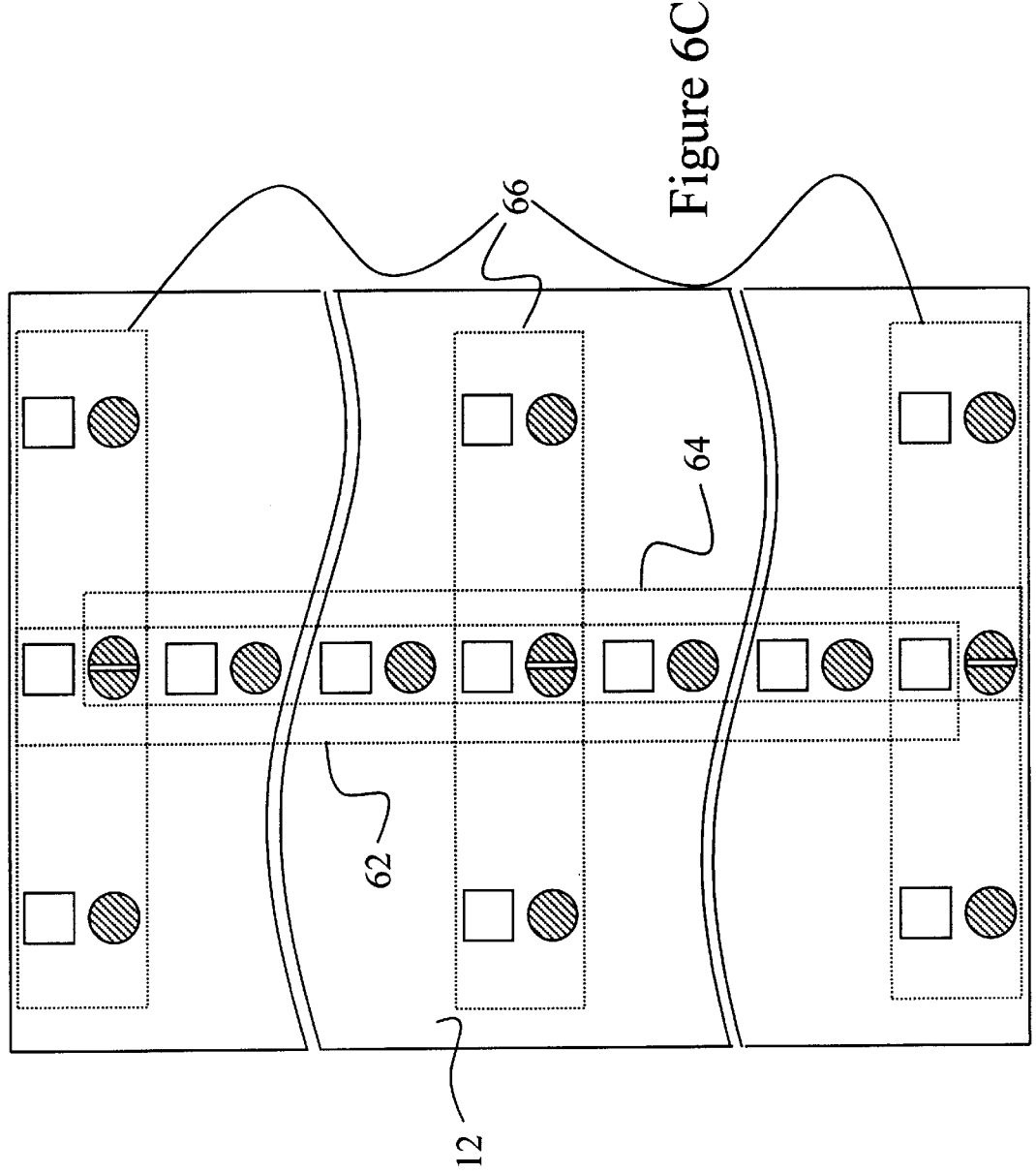
FIG. 6C is a diagrammatic representation of yet another arrangement of a Laser/Detector Block according to the present invention with a multi-track laser/detector array.

Referring to FIG. 6C, an alternative arrangement of multi-track optical pick-up laser/detector array suitable for the design and orientation of the BL 14 shown in FIG. 1A is presented. In this layout, the laser array 62 and the detector array 64 are interspersed together, so that lasers and detectors for data reading are serially arranged along a single line interleaving each other. Multiple sets of tracking, focusing, and magnification servo control elements 66 are positioned at the ends and in the middle of the multi-track reader array, and the error signals are processed in the same way as detailed above. The distances between adjacent elements on the LDB 12 are adjusted according to the parameters of the BL 14 to prevent cross talk and laser feedback. When elements of the data reading array are spaced out evenly and all the lasers are turned on together, additional cross talk may occur due to the double beam spots generated with each of the laser beams after they pass through the BL 14. One means to solve this problem is to turn on and off the data reading lasers sequentially in a raster scanning fashion.

Figure 6D:
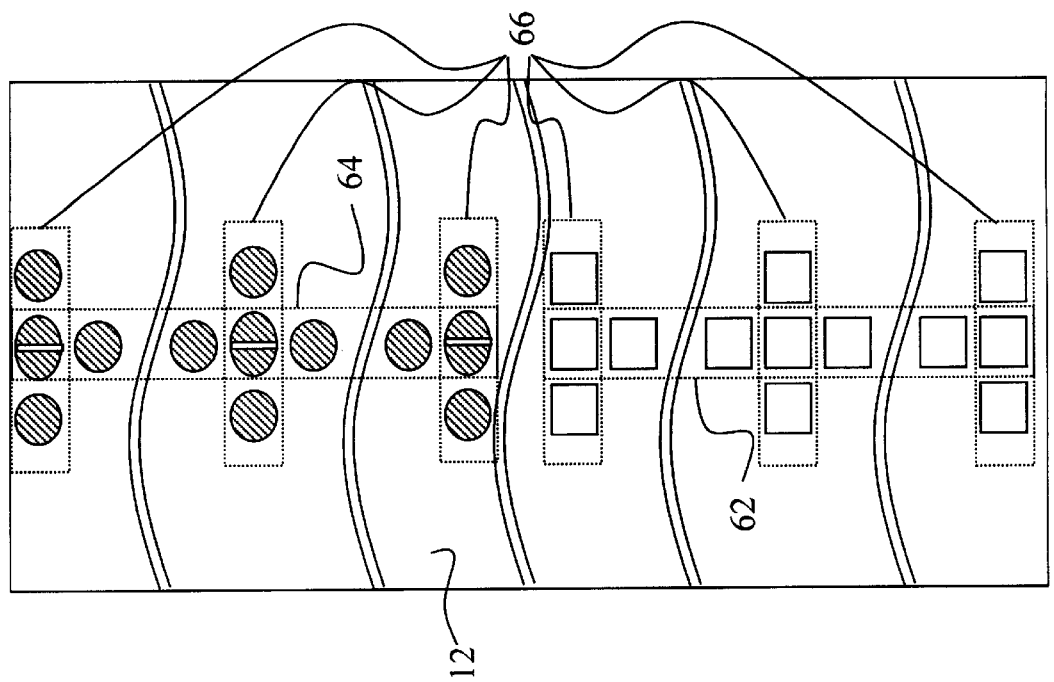
FIG. 6D is a diagrammatic representation of still another arrangement of a Laser/Detector Block according to the present invention with a multi-track laser/detector array.

A preferred alternative arrangement for the multi-track optical pick-up laser/detector array is one in which the laser array 62 and the detector array 64 are separated, as shown in FIG. 6D. The data reading lasers and detectors are all aligned serially on a mid-line on the LDB 12. The configuration in FIG. 1A is the choice for the design and orientation of the BL 14 and the tracking and focusing servo control elements 66. The large and complete separation between the laser array 62 and the detector array 64 effectively eliminates potential cross talk and laser feedback. Another alternative, although less preferred, adopts the design and orientation of the BL 14 and the tracking and focusing elements 66 illustrated in FIG. 3B. This alternative is equally sound and effective in separating the laser array from the detector array. The only problem associated with this alternative is the lateral expansion of the beam spots perpendicular to the data tracks, which may potentially cause significant cross talk.

Figure 6E:
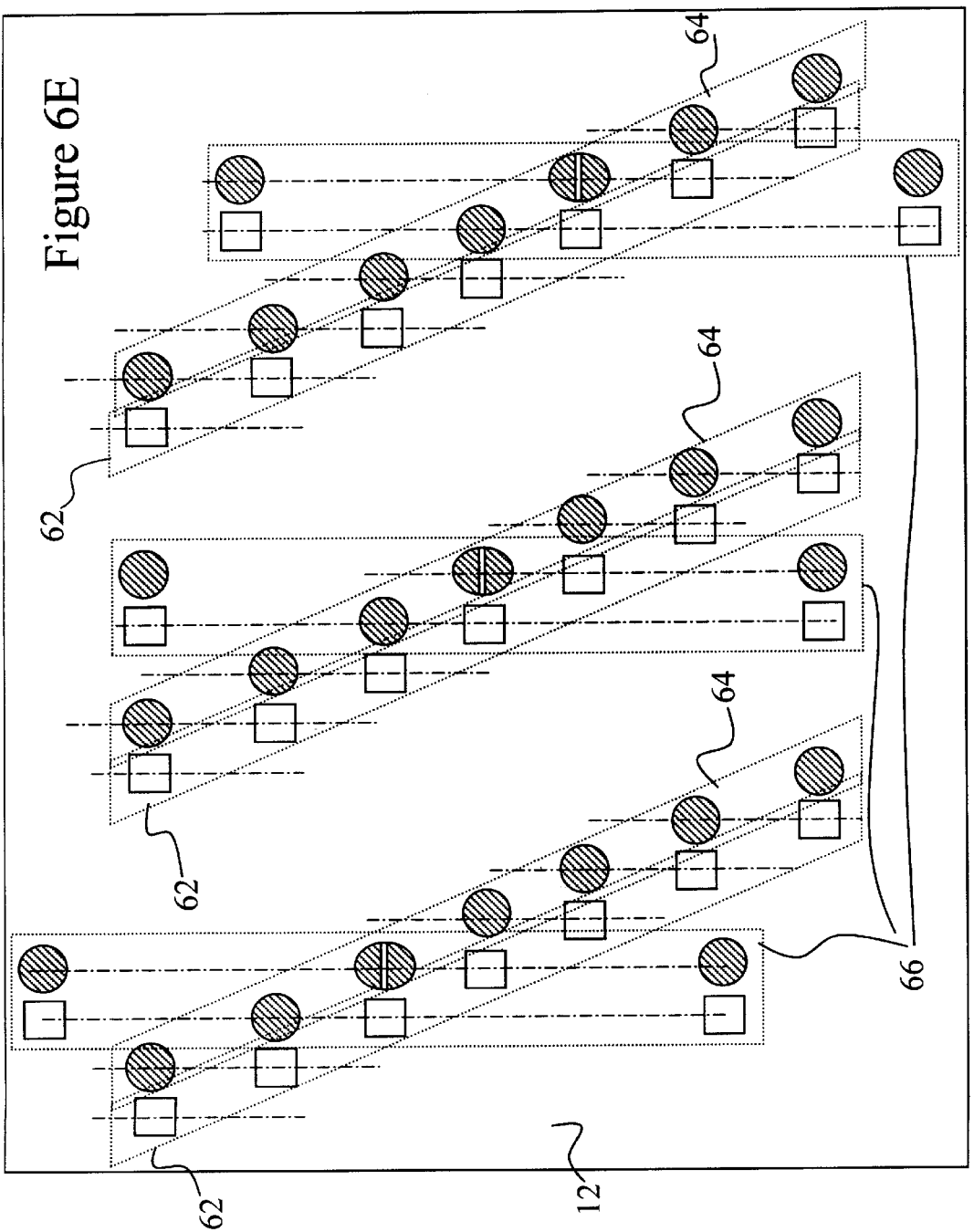
FIG. 6E is a diagrammatic representation of a further arrangement of a Laser/Detector Block according to the present invention with a multi-track laser/detector array.

Referring to FIG. 6E, another preferred matrix arrangement of the multi-track optical pick-up laser/detector array is described. A matrix laser array 62 and a matrix detector array 64 are aligned in parallel. Dotted lines underlying the lasers (square blocks) indicate the adjacent data tracks on the OD 16 that are read by the corresponding lasers on top. Incorporation of multiple sets of servo control elements 64 is an absolute necessity here because of the large number of data reading laser/detector pairs involved. Within-pair spacing between each laser and its corresponding detector is adjusted according to the parameters of the BL 14, while between-pair spacing is expanded to prevent cross talk and laser feedback. As described above, these problems can be more effectively eliminated through complete separation of the laser array 62 from the detector array 64.

Figure 6F:
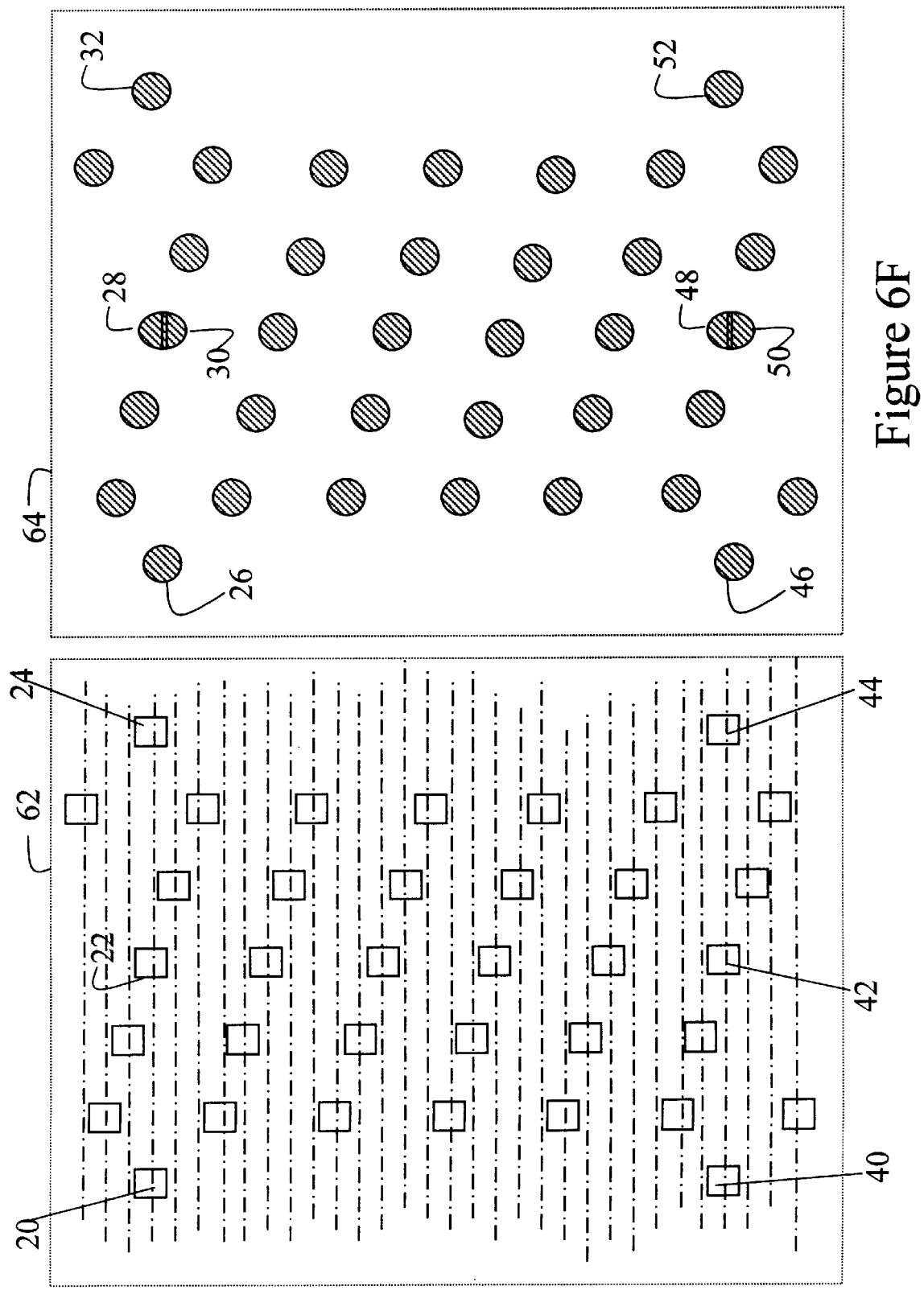
FIG. 6F is a diagrammatic representation of still a further arrangement of a Laser/Detector Block according to the present invention with a multi-track laser/detector array.

Referring to FIG. 6F, yet another preferred matrix arrangement of the multi-track optical pick-up laser/detector array is illustrated. Similar to the layout in FIG. 6E, a matrix laser array 62 and a matrix detector array 64 are aligned in parallel. Dotted lines underlying the lasers (square blocks) indicate the adjacent data tracks on the OD 16 that are read by the corresponding lasers on top. Multiple sets of servo control elements 64 are incorporated into the array in a slanted fashion. Again, within-pair spacing between each laser and its corresponding detector is adjusted according to the parameters of the BL 14, while between-pair spacing is expanded to prevent cross talk and laser feedback. This matrix laser/detector array configuration and the one shown in FIG. 6E both have the potential of improving data access rate many folds with different optical data storage and retrieval embodiments. A moderate 5×5 matrix array easily affords the capacity of reading 25 data tracks simultaneously. A realistic and practical 10×10 matrix array will boost the concurrent multi-track reading capacity to an impressive 100 tracks.

As was mentioned above, the correction of optical magnification should be provided during a multi-track reading process. This is necessary for the proper matching of the focal spots from all activated lasers to the track positions on the disk OD. All spots cannot be positioned on the tracks without such correction because of tolerances for laser position on LDB, for track pitch on the disk OD, and for the shape of optical elements used in the optical pickup system 10. In the previously described embodiments, for example in FIGS. 5A–6F, the magnification error is detected and is corrected by the servo-controlled movement of both the LDB and the Bilens BL.

Advantageously, a further embodiment of the present invention provides a means for solving this problem that does not require the additional degree of freedom required by a servo system. Instead of employing a single laser/detector pair, a group of them can be assigned to the same track. The coordinates of each pair in the group perpendicular to the track are slightly different. In this way, the electronic correction of optical magnification can be made by choosing a laser/detector pair in each group that best matches the position of the assigned track on the disk OD.

This method simplifies the servo system and allows fast correction of optical magnification because it avoids additional mechanical movements. However, it does significantly increase the required number of laser/detector pairs in LDB. Therefore, a large number of such elements should be optimally disposed on the LDB. There are two opposite requirements regarding the arrangement of elements. Lasers should be placed as close as possible one to another to reduce the size of laser matrix. Otherwise, the beams of border lasers cannot be focused on the disk within a diffraction limited spots size due to aberrations of the optical system. Additionally, groups of lasers should belong to the neighboring tracks on the disk and be disposed close to each other along the direction perpendicular to the tracks. Contrarily, the distance between neighboring detectors must be bottom limited to avoid the cross talk and cannot be made too small. However, the geometry of the laser array should copy the arrangement of the detector array. These apparently opposing requirements should be met simultaneously.

Figure 6G:
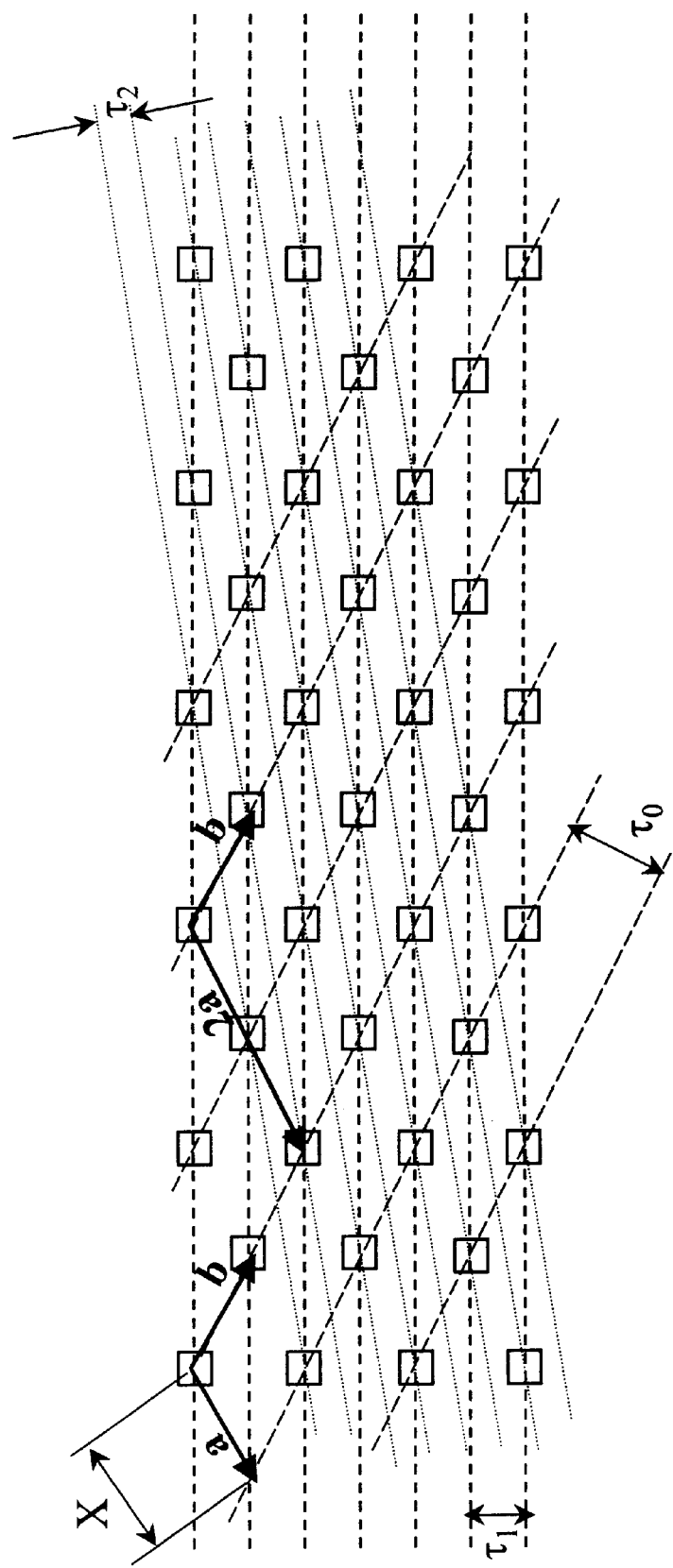
FIG. 6G is a diagrammatic representation of a most compact design of a multi-track laser/detector matrix with the electronic correction of the optical magnification according to the present invention.

FIG. 6G demonstrates a flexible solution to that problem that advantageously allows a choosing of the appropriate distance between neighboring elements of the LDB while keeping their disposition most compact. As is exhibited in crystallography, a hexagonal structure of elements is the most compact two-dimensional structure possible because all distances between neighboring elements are equal. FIG. 6G shows a fragment of the LDB wherein the elements are arranged in a hexagonal lattice. The dashed lines indicate the images of optical disk tracks on the LDB surface. Each track is associated with a group of array elements.

In FIG. 6G it is seen that, depending on the track orientation, the relation between track pitch $\tau_n$ at the LDB plane and inter-element distance X is different. For the track positions with the pitch $\tau_0$, the amounts of these parameters are close: $X=1.15\,\tau_0$. Because $\tau_0$ is smaller than 10 $\mu$m, X should be of the same amount in this design. This value is not sufficiently large to avoid the cross talk on the detector array. All other orientations of the track direction can be determined by the coordinates of neighboring elements, crossed by the track, in the lattice axes a and b. The direction of the tracks with the pitch $\tau_1$ can be described as (1,1), with the pitch $\tau_2$ as (2,1), and so on.

Generally, the connection between the track pitch $\tau_n$ on the LDB plane with orientation (n,1), and the distance X could be expressed with an equation $X=2\,\tau_n\,[(n^2+n+1)/3]^{1/2}$. However, the track pitch $\tau_n$ at the LDB plane does not depend on the track orientation, and all $\tau_n$ are equal to the track pitch t on the disk multiplied by the optical magnification factor M such that $\tau_n=M\,t$. Accordingly, the amount of inter-element space X depends on the chosen track orientation, which is described with parameter n:

$$X_n=2Mt[(n^2+n+1)/3]^{1/2} \qquad (1)$$

From the equation (1), one can see that the inter-element distance X can be arbitrarily chosen while the structure of the element array is kept hexagonal. That is the most compact configuration for the chosen X.

Figure 6H:
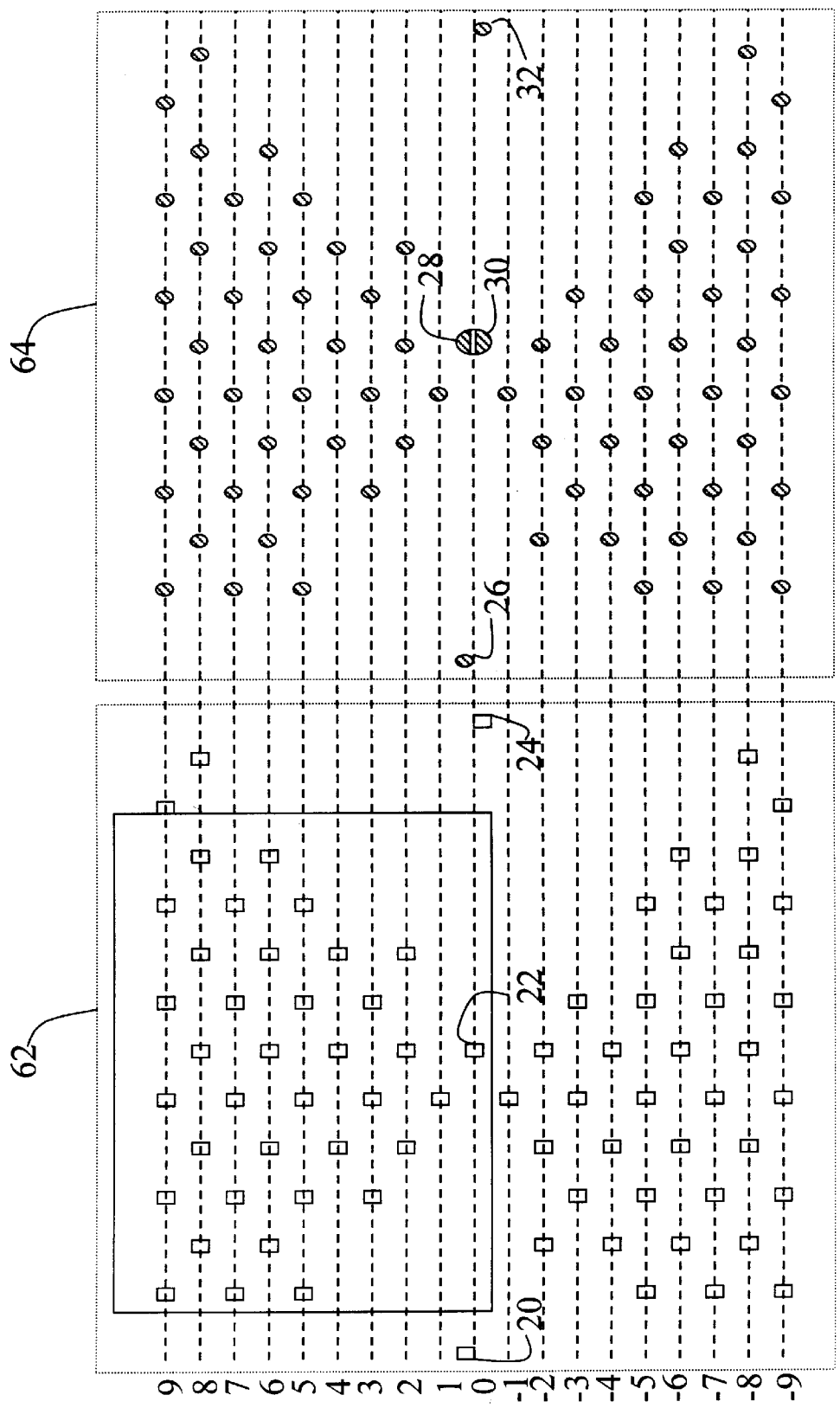
FIG. 6H is a diagrammatic representation of an arrangement of a multi-track Laser/Detector Block with electronic correction of the optical magnification designed in accordance with the principle of FIG. 6G.

Referring to the FIG. 6H, the design of the LDB for parallel reading of 19 tracks with electronic correction of optical magnification is shown. It contains laser array 62 and detector array 64. Also, lasers 20 and 24 along with corresponding detectors 26 and 28 provide tracking employing the outrigger method described above. Focusing is provided by the central laser 22 and by the detector pair 28, 30 with a half-aperture method. Because only the central beam belonging to the central track 0 is kept on the track, the groups of elements are assigned to the periphery tracks. The tracks are numbered from the central track. The number of additional elements increases on the way from center to the border, which accommodates error accumulation for the focal spot position on the disk.

The structure of the arrays corresponds to (1,1) track orientation in FIG. 6G. Therefore, the inter-element distance X is twice as large as the track pitch $\tau_1$ on the LDB plane, which equals M t. For reading a CD, this is quite enough value for the avoiding cross talk because M=6 usually and t=1.6 $\mu$m for a CD. This gives an estimated X=20 $\mu$m while the spot size on detector is about 10 $\mu$m. In accordance with the equation (1), for a DVD with t=0.74 $\mu$m, the use of track orientation (4,1) is required to get approximately the same amount of X=18.5 $\mu$m avoiding the cross talk.

The number of additional lasers $p_k$ in the group assigned to the track with a number ±k (k=1,2, ... 9 in FIG. 6H) depends on k, on the allowed tracking error $\Delta t$, and on the maximal possible shift $\delta t$ between the track with a number 1 and a focal spot on it. The last parameter is determined by the tolerances for laser position on LDB, for track pitch on a disk, and for parameters of the optical elements. The perpendicular to the track shift between neighboring elements in the group should be equal to 2M $\Delta t$. In this case, the maximal shift between the laser spot on the disk and the track will not be more than allowed tracking error $\Delta t$. In the assumption that shifts $\delta t$ are accumulated with the same signs up to the track with a number k, one can get the formula for $p_k$:

$$p_k = 2Int[(k\delta t/\Delta t + 1)/2] \qquad (2)$$

where Int means the integer part of the value in brackets.

Equation (2) describes a safe estimation of the necessary number of additional elements under extremely unfavorable conditions. For statistically reliable conditions, when the errors $\delta t$ are added randomly, the required $p_k$ is smaller:

$$p_k = 2Int[(k^{1/2}\delta t/\Delta t + 1)/2] \qquad (3)$$

The distribution of lasers over the detected tracks in FIG. 6H was calculated in accordance with the equation (2) for $\delta t=0.1$ $\mu$m, $\Delta t=0.16$ $\mu$m as an example. The laser array containing 73 lasers with the inter-element distance 18 $\mu$m occupies only 250 $\mu$m×300 $\mu$m area.

Figure 6J:
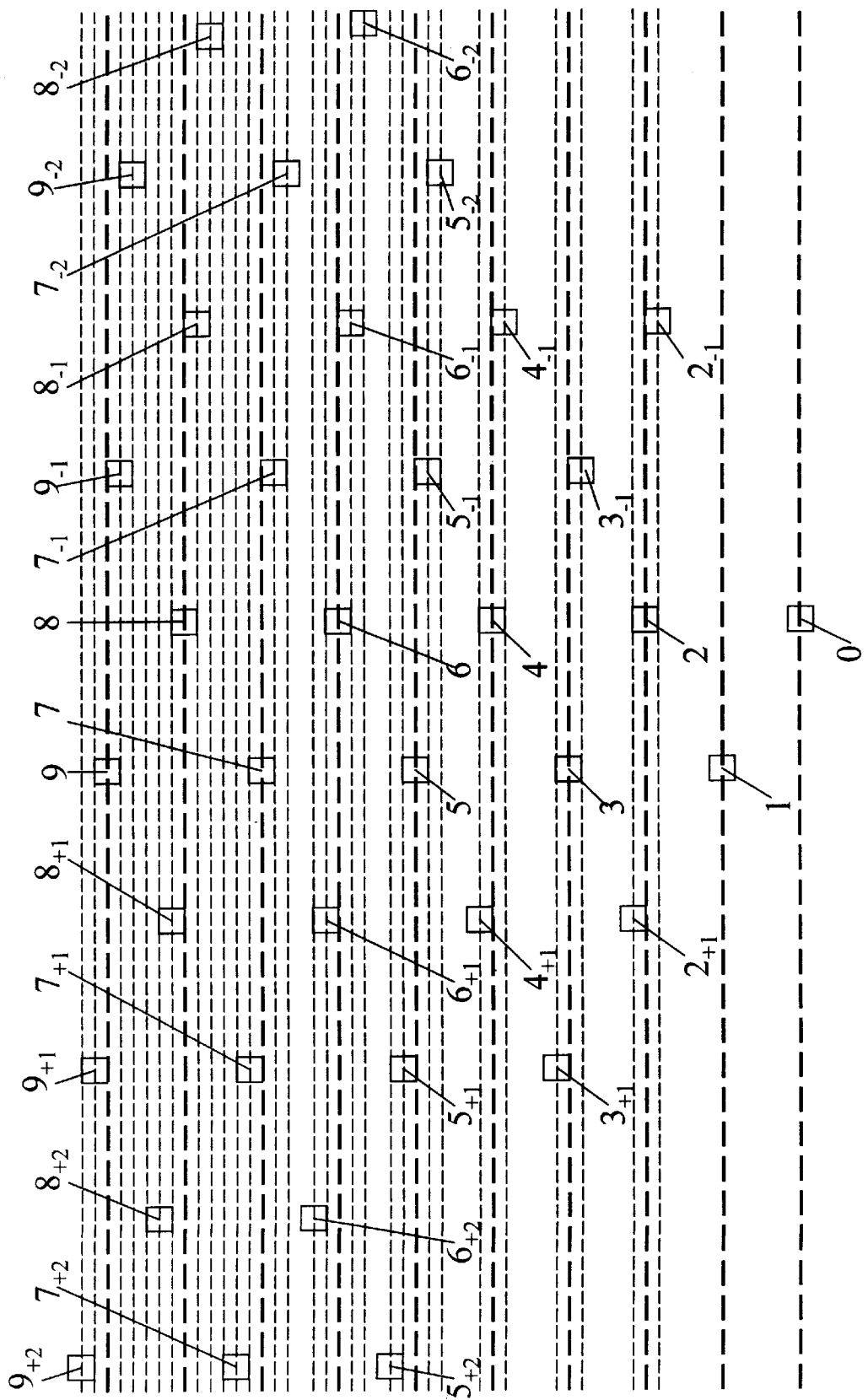
FIG. 6J is a detailed diagrammatic representation of the FIG. 6H fragment.

FIG. 6J depicts a detailed fragment of the portion of the laser array of FIG. 6H that is indicated with a solid rectangle. All elements are numbered in accordance with the number of the assigned track. The open circles show the position of the central elements in each group corresponding to the average positions of the track. The elements numbered with digits and subscripts show the positions of additional lasers providing the electronic correction of optical magnification. The switch of the elements within each group is made when the magnitude of detected signal is decreased.

Figure 6K:
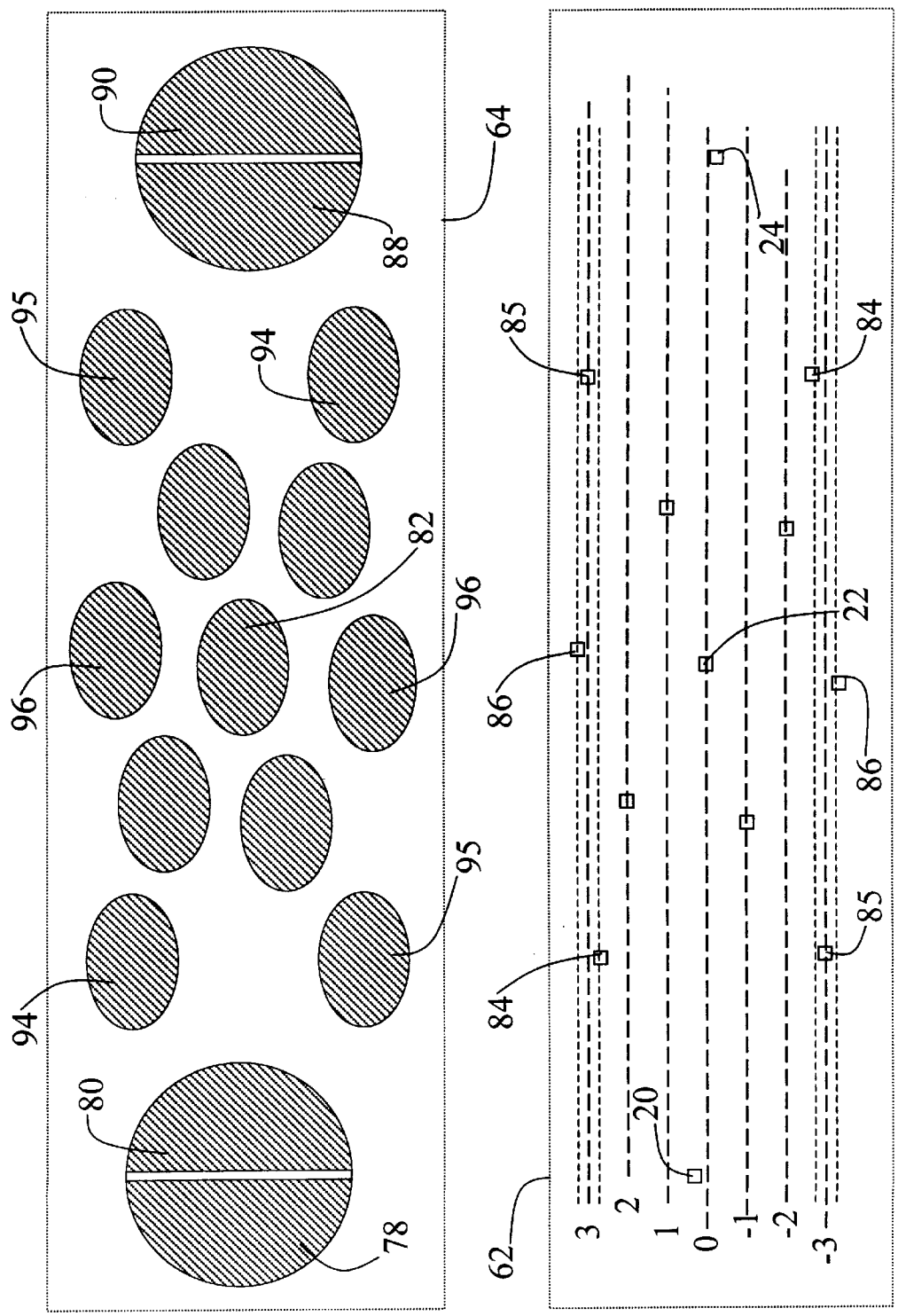
FIG. 6K is a preferred diagrammatic layout of a Laser/Detector Block with electronic correction of optical magnification for simultaneous reading of 7 tracks.

In FIG. 6K, one can see a preferred arrangement of lasers and detectors for reading 7 tracks from a CD with electronic correction of optical magnification. The chip contains a laser array 62 and a detector array 64. The element disposition in both arrays is made in accordance with the present invention's hexagonal structure. Additional elements are assigned to ±3$^{rd}$ tracks only in accordance to the equation (3) with the same amounts $\delta t=0.1$ $\mu$m and $\Delta t=0.16$ $\mu$m for the parameters as above. The illustrated chip layout is made for the optical designs drawn either in FIG. 1A or in FIG. 4A.

The focal spot from the central laser 22 is kept on the track because of detection of tracking error with outrigger method and of error correction by the servo system. Lasers 20 and 24 are placed off-track to provide for the detection of tracking error with this method. Two pairs of detectors: 78, 80 and 88, 90 register tracking error signal (TES) as well as focus error signal (FES). Focus error is detected with half-aperture method by the same detectors because both optical designs (of FIG. 1A and of FIG. 4A) allow detection of only half beams coming to detectors after the reflection from a CD. The servo system is controlled by the signals calculated in accordance with the equations:

$$TES=(D78+D80)-(D88+D90)$$

$$FES=(D78-D80)+(D88-D90)$$

Electronic correction of optical magnification is made under the following procedure. Initially in both groups of border lasers 84, 85, 86, only central lasers 85 are activated. When the spots of these lasers on the CD are out-of-track, the levels of informative signals from corresponding detectors 95 are significantly smaller than that from the central detector 82. This is because the central spot is kept on the track by the tracking servo. After such decrease is detected, the lasers 84 and corresponding detectors 94, which are closer to the center, are activated. If the signal levels from the detectors 94 are still less than from the detector 82, the lasers 86 along with detectors 96 are activated. Such adjustment procedure will be made very quickly and will not significantly affect the information transfer rate.

Figure 7A:
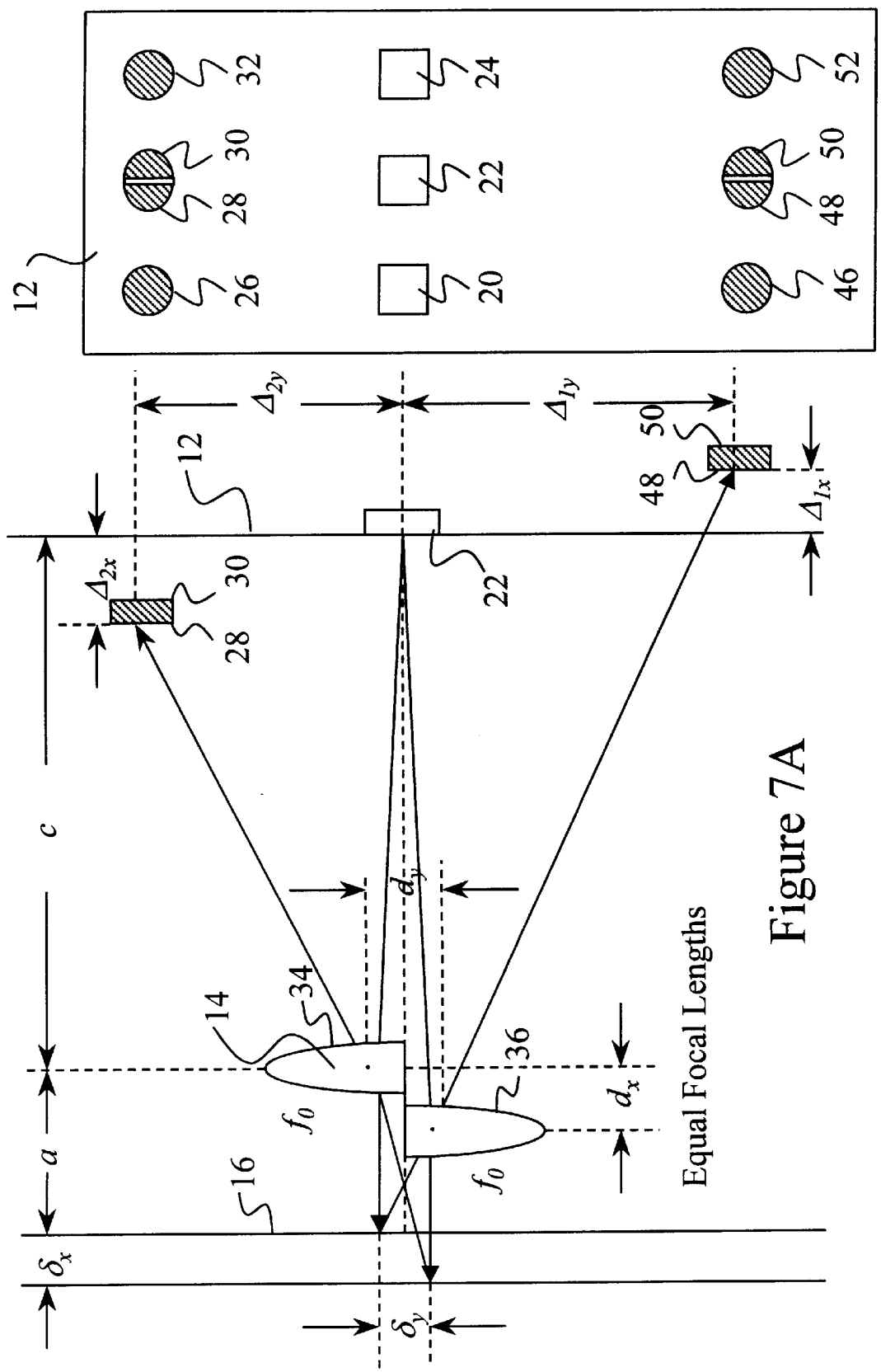
FIG. 7A is a diagrammatic representation in side elevation of an Optical Pickup and Servo Control System according to the present invention for use with dual-layer optical disks.

Referring to FIG. 7A, a schematic of a simultaneous optical pick-up assembly 10 for use with a dual-layer OD 16 such as DVDs is presented. The two halves 34 and 36 of the BL 14 applied here have equal focal lengths $f_0$. Unlike previous designs, they are also shifted along the optical axis. The exact amount of this axial shift $d_x$ is determined by the vertical distance $\square_x$ between the two target tracks on different layers and the magnification factor M:

$$d_x = \delta_x M^2/(M^2-1)$$

Because of large M (>5), numerically $d_x$ almost equals $\delta_x$. This axial shift $d_x$ in turn necessitates differential planer shifts of detectors 26, 28, 30, 32 and 46, 48, 50, 52 with respect to the lasers 20, 22, and 24 on the surface of the LDB 12. The two shifts, designated as $\Delta_{1x}$ and $\Delta_{2x}$ respectively, are of same value and in opposite directions to each other:

$$\Delta_{1x} = \Delta_{2x} = \delta_x M^2$$

That is, detectors 26, 28, 30, and 32 are fabricated on a raised plane parallel to the surface of the LDB 12 with a distance of $\Delta_{1x}$, while detectors 46, 48, 50, and 52 are on an indented parallel plane with a distance of $\Delta_{2x}$ to the same surface. Again because of large numerical value of M, $\Delta_{1x}$ and $\Delta_{2x}$ are substantially larger than $\delta_x$. Such a requirement potentially adds difficulties to the fabrication of lasers and detectors on the LDB 12. The lateral distances between laser 22 and detector pairs 28, 30 and 48, 50, labeled $\Delta_{1y}$, and $\Delta_{2y}$, are equal in magnitude. They are dependent on the horizontal distance $\delta_y$ between the two target tracks on different layers, and the magnification factor M:

$$\Delta_{1y} = \Delta_{2y} = \delta_y M,$$

while other parameters are determined by the following formulas:

$$M = c/a$$

$$f_0 = aM/(M+1)$$

$$d_y = \delta_y M/(M+1)$$

Figure 7B:
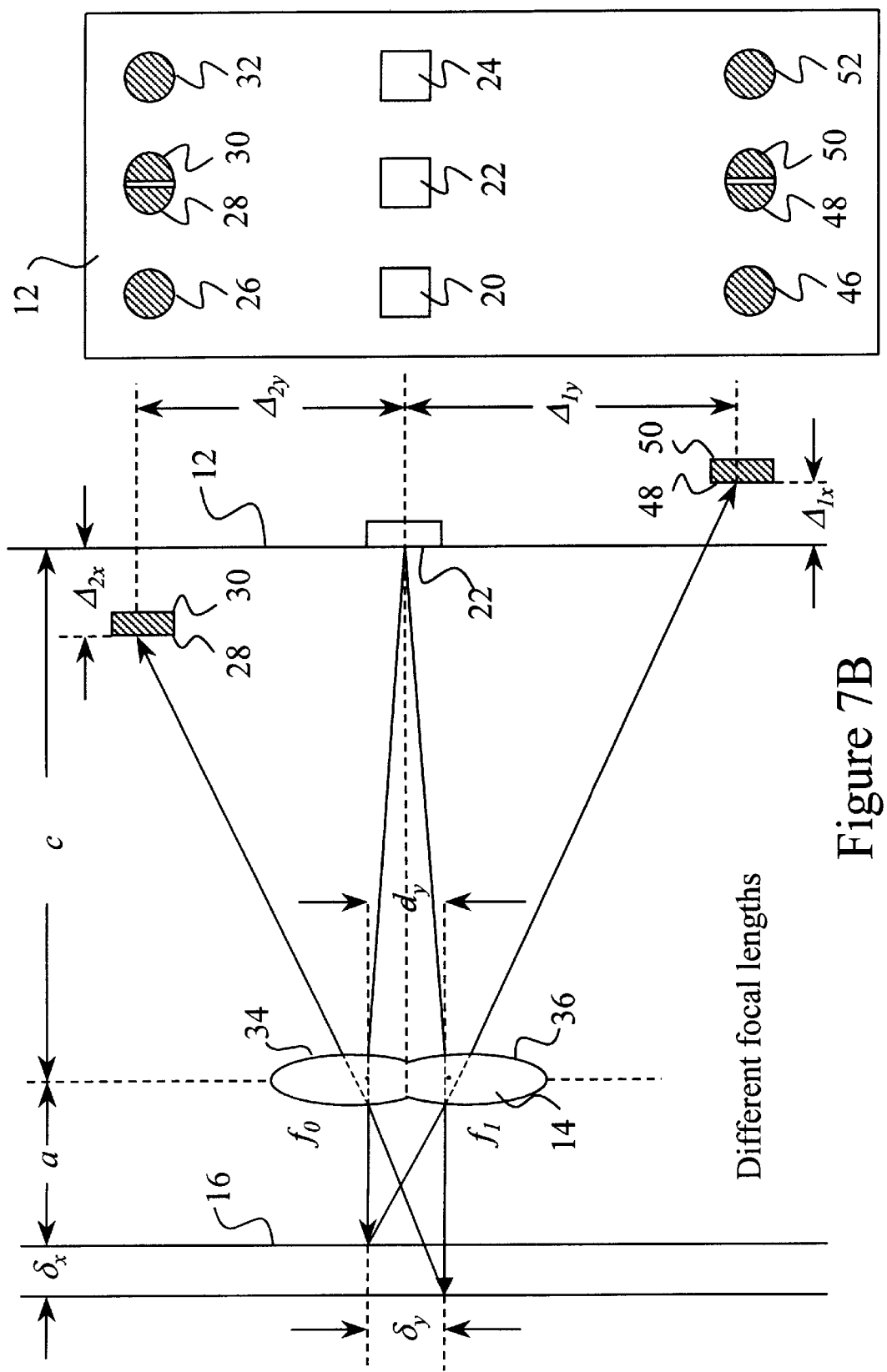
FIG. 7B is a diagrammatic representation in side elevation of an alternative Optical Pickup and Servo Control System according to the present invention for use with dual-layer optical disks.

Referring to FIG. 7B, an alternative scheme of a simultaneous optical pick-up assembly 10 for dual-layer OD 16 is illustrated. The single major difference between this design and the layout in FIG. 7A is that the BL 14 here in FIG. 7B is composed of two halves 34 and 36 with different focal lengths, $f_0$ and $f_1$, with the latter being dependent on the former:

$$f_1 = f_0(1 + \delta_x M/(c+a))$$

Since $\delta_x$ is of magnitudes smaller than c and d, the numerical value of $f_1$ is in fact very close to $f_0$. The axial shift of detectors 46, 48, 50, and 52 should be corrected with the following formula:

$$\Delta_{1x} = \delta_x(M^2 - 1)$$

The large magnitude of $M^2$ renders the correction to be minute.

Figure 8B:
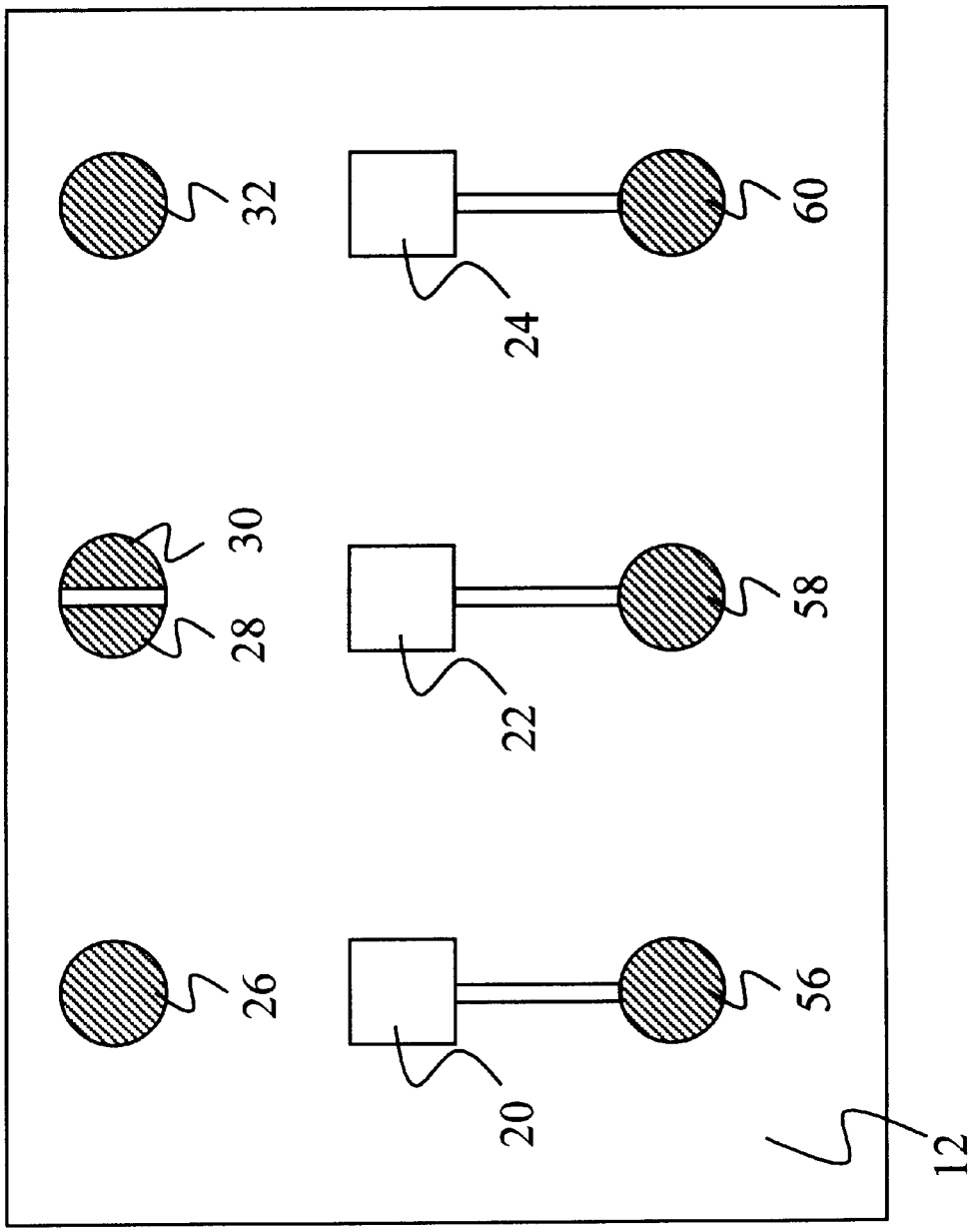
FIG. 8B is a diagrammatic representation of another alternative Laser/Detector Block according to the present invention employing a wave guidance for monitoring temperature.

It is general knowledge that temperature changes interfere with laser output stability. For surface emitting lasers, temperature changes may alter laser wavelength and evoke multi-mode laser emission. Temperature increase elongates the laser resonance cavity, thus causing emission of other modes of laser and increased laser energy output. This type of thermal-dependent change is non-continuous, thus causing mode-to-mode jumps and noise production. To prevent temperature induced noises, there are two effective methods that are readily adaptable. One is to use a highly sensitive thermal resistor 54 to monitor temperature changes and feedback to adjust laser output power, as is shown in FIG. 8A. The particular designs of the BL 14 described in this invention effectively eliminate the occurrence of laser feedback. Therefore, thermal monitoring and feedback is sufficient to stabilize laser output power. Alternatively, as illustrated in FIG. 8B, wave guidance can be applied here to monitor and feedback the laser output power through wiring photo detectors 56, 58, and 60 to lasers 20, 22, and 24, respectively.

Figure 9A:
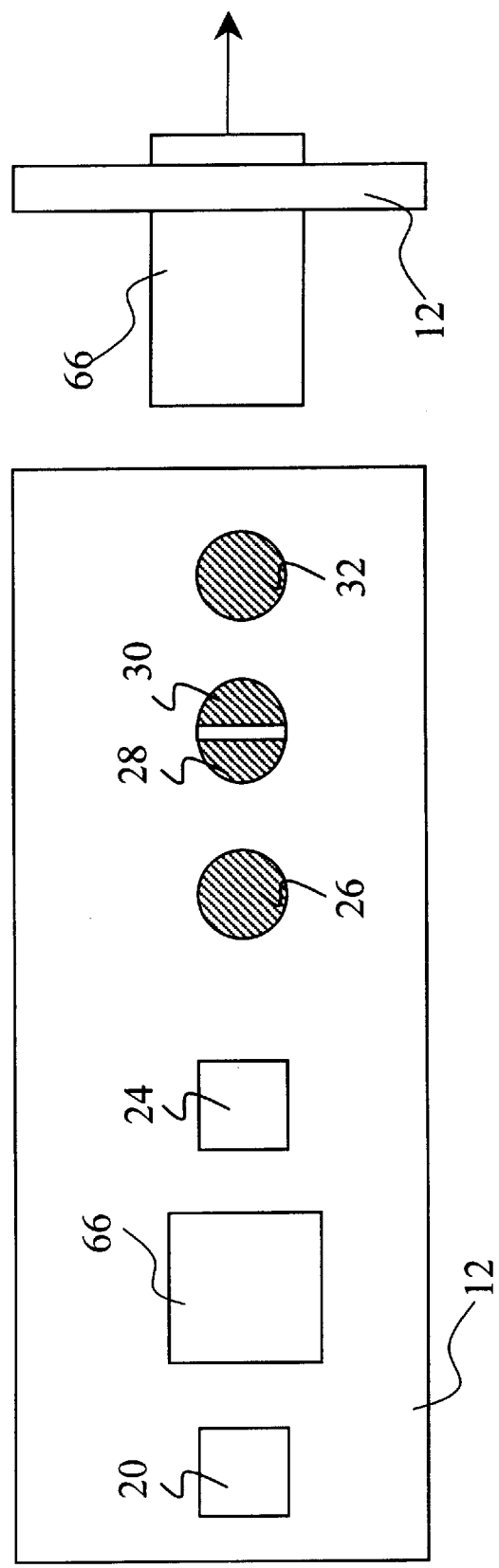
FIG. 9A is a diagrammatic representation in side elevation of a Laser/Detector Block capable of recording and reading optical data.

Referring to FIG. 9A, a schematic design of the optical pick-up laser/detector array with data recording capability is shown. As a modification from the illustration in FIG. 3C, a more powerful edge-emitting laser 66 is mechanically embedded into the LDB 12 to replace laser 22. Unlike the read-only lasers 20, 22, and 24, which are integrally embedded within the single-substrate LDB 12, the edge-emitting laser 66 must be mechanically associated with the LDB 12 because of its high power. All other elements on the LDB 12 remain the same and function the same way as described in FIG. 3C. During the recording mode, the power for laser 66 is set to about 15–20 mW, high enough to produce the necessary changes on the optical storage media for data recording. During the reading mode, the power for laser 66 is reduced to about 1 mW, same as for lasers 20 and 24, so that data reading will be carried out the same manner as in FIG. 3C.

Figure 9B:
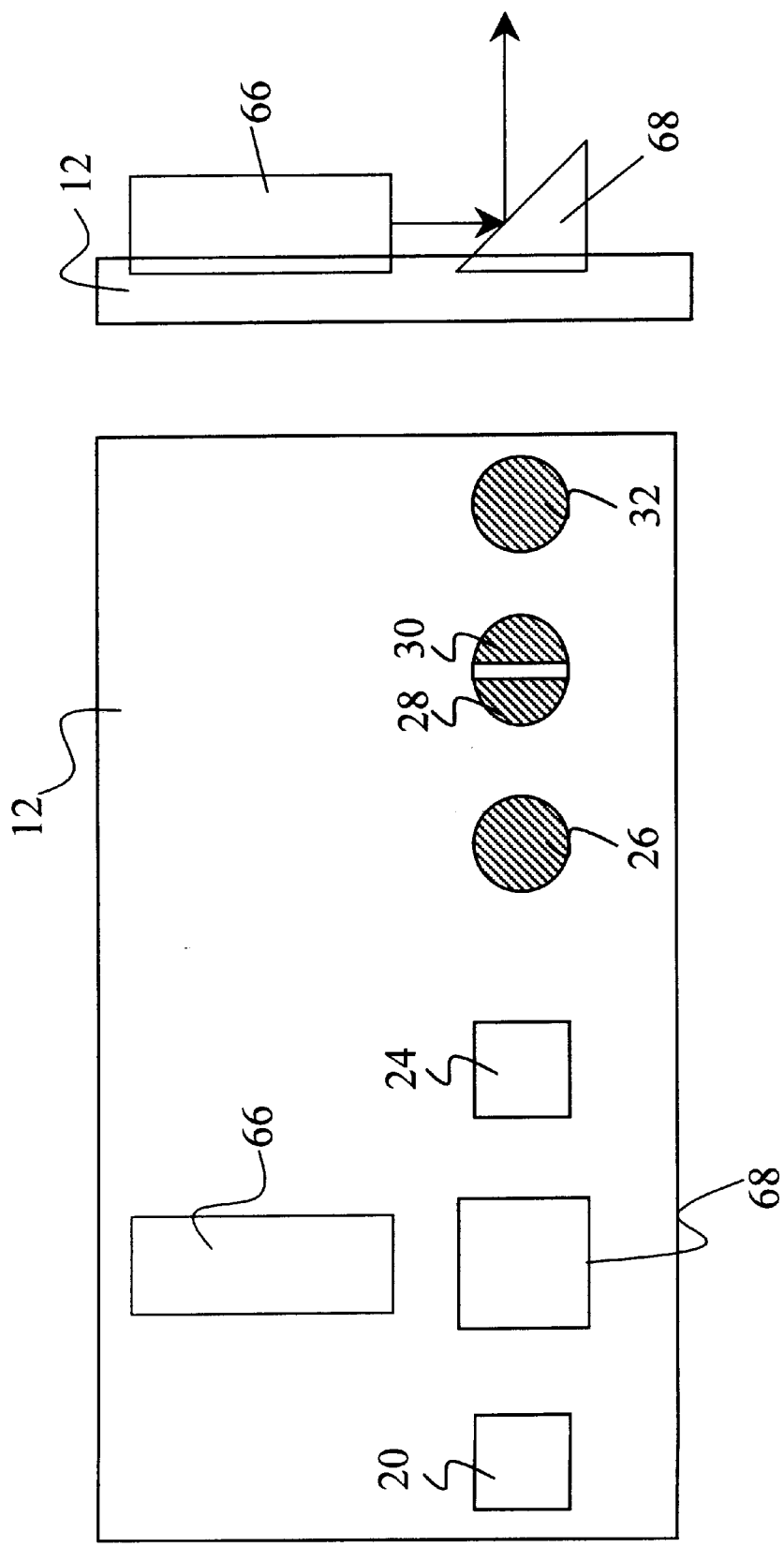
FIG. 9B is an alternative diagrammatic representation in side elevation of a Laser/Detector Block capable of recording and reading optical data.

FIG. 9B shows another design of the optical pick-up laser/detector array alternative to the one in FIG. 9A. The edge-emitting laser 66 is mechanically incorporated onto the LDB 12 modified from the illustration in FIG. 3C, so that the emitted light runs parallel to the plane of the LDB 12. A prism 68 replaces laser 22 to redirect the beam from laser 66 to be parallel to the beams from lasers 20 and 24. All other elements on the LDB 12 remain unchanged so that both recording and reading are processed in the same way as described above. Both layouts presented here in FIGS. 9A and 9B incorporating the edge-emitting recording laser 66 into the LDB 12 can be applied to any LDB 12 designs detailed in the current invention.

It will be clear that the present invention has been shown and described with reference to certain preferred embodiments that merely exemplify the broader invention revealed herein. Certainly, those skilled in the art can conceive of alternative embodiments. For instance, those with the major features of the invention in mind could craft embodiments that incorporate those major features while not incorporating all of the features included in the preferred embodiments.

With the foregoing in mind, the following claims are intended to define the scope of protection to be afforded the inventor, and the claims shall be deemed to include equivalent constructions insofar as they do not depart from the spirit and scope of the present invention. A plurality of the following claims express certain elements as a means for performing a specific function, at times without the recital of structure or material. As the law demands, these claims shall be construed to cover not only the corresponding structure and material expressly described in the specification but also equivalents thereof.

We claim as protected by United States Letters Patent:

1. An optical pickup system for optical recording mediums with data disposed on a plurality of adjacent track portions thereof wherein the optical pickup system provides for correction of optical magnification without mechanical movement, the optical pickup system comprising:

a first group of pairs of generating means for generating at least one optical beam and detecting means for detecting data from a reflected optical data stream wherein the pairs of the first group of pairs are assigned to a single track on the optical recording medium and wherein the first group of pairs comprises:

a first pair of generating means and detecting means; and a second pair of generating means and detecting means;

wherein the first and second pairs of generating means and detecting means have different coordinates in a direction perpendicular to the single track;

whereby a correction of optical magnification of the group of pairs relative to the single track on the optical recording medium can be made without a need for mechanical movement of the group of pairs by choosing a pair of generating means and detecting means from the group of pairs dependent upon a relative position of the single track on the optical recording medium;

a means for directing the at least one optical beam generated by each generating means onto the optical recording medium to generate at least one reflected optical data stream; and a means for directing the at least one reflected optical data stream onto the detecting means that is paired with the respective generating means.

2. The optical pickup system of claim 1 wherein there are a plurality of groups of pairs of generating means and detecting means wherein each group of pairs is assigned to a different track on the optical recording medium and wherein each pair of generating means and detecting means within each group has different coordinates in a direction perpendicular to the respective track of that group of pairs of generating means and detecting means relative to the other pairs of generating means and detecting means within that group.

3. The optical pickup system of claim 2 wherein at least the generating means of the plurality of groups of pairs of generating means and detecting means are arranged in a hexagonal lattice relationship whereby the generating means are arranged in a compact configuration.

4. The optical pickup system of claim 3 wherein the hexagonal lattice relationship of the generating means is substantially two-dimensional.

5. The optical pickup system of claim 3 wherein the groups of pairs of generating means and detecting means are arranged with a first pair of generating means and detecting means assigned to a central track of the optical recording medium and with pairs and groups of pairs of generating means and detecting means assigned to succeeding tracks adjacent to the central track up to a border track to achieve the hexagonal lattice arrangement.

6. The optical pickup system of claim 5 wherein the average number of pairs of generating means and detecting means per track follows a generally increasing pattern from the central track to the border track thereby accommodating error accumulation on the optical recording medium by providing, on average, a greater number of pairs of generating means and detecting means that are available for choosing for each successive track away from the central track.

7. The optical pickup system of claim 5 wherein the pairs and groups of pairs of generating means and detecting means are mounted on a single retaining member and wherein the optical pickup system further comprises a means for tracking the first pair of generating means and detecting means that are assigned to the central track.

8. The optical pickup system of claim 7 wherein the means for tracking the first pair of generating means and detecting means that are assigned to the central track comprises second and third pairs of generating means and detecting means assigned to the central track to provide tracking according to an outrigger method.

9. The optical pickup system of claim 3 wherein neighboring generating means are spaced a given inter-element distance apart and wherein the inter-element distance between neighboring generating means is substantially equal.

10. The optical pickup system of claim 9 wherein the inter-element distance between neighboring generating means is determined by the equation:

$$X_n = 2Mt[(n^2+n+1)/3]^{1/2}$$

where M is the optical magnification factor, t is the track pitch on the optical recording medium, and n is the relative track orientation.

11. The optical pickup system of claim 10 wherein the track orientation n is equal to 1 whereby the inter-element distance X equals twice the magnification factor M multiplied by the track pitch t on the optical recording medium, which product equals a track pitch $\tau_1$ at a plane of the generating means.

12. The optical pickup system of claim 2 wherein the generating means are disposed with at least one generating means assigned to a central track of the optical recording medium and with a number of generating means assigned to each track adjacent to the central track as determined by the formula:

$$p_k = 2Int[(k\delta t/\Delta t+1)/2]$$

where $p_k$ is the number of generating means, Int is the integer part of the value in brackets, k is the incremental track number away from the central track, $\delta t$ is the maximum possible shift between a track with a number 1 and a focal spot on it, and $\Delta t$ is the allowed tracking error whereby the optical pickup system can maintain proper focusing even during unfavorable conditions.

13. The optical pickup system of claim 12 wherein at least the generating means of the plurality of groups of generating means and detecting means are arranged in a hexagonal lattice relationship whereby the generating means are arranged in a compact configuration.

14. The optical pickup system of claim 13 wherein neighboring generating means are spaced a given distance inter-element distance apart and wherein the inter-element distance between neighboring generating means is substantially equal.

15. The optical pickup system of claim 14 wherein the inter-element distance between neighboring generating means is determined by the equation:

$$X_n = 2Mt[(n^2+n+1)/3]^{1/2}$$

where M is the optical magnification factor, t is the track pitch on the optical recording medium, and n is the relative track orientation.

16. The optical pickup system of claim 2 wherein the generating means are disposed with at least one generating means assigned to a central track of the optical recording medium and with a number of generating means assigned to each track adjacent to the central track as determined by the formula:

$$p_k = 2Int[(k^{1/2}\delta t/\Delta t+1)/2]$$

where $p_k$ is the number of generating means, Int is the integer part of the value in brackets, k is the incremental track number away from the central track, $\delta t$ is the maximum possible shift between a track with a number 1 and a focal spot on it, and $\Delta t$ is the allowed tracking error.

17. The optical pickup system of claim 16 wherein at least the generating means of the plurality of groups of generating means and detecting means are arranged in a hexagonal lattice relationship whereby the generating means are arranged in a compact configuration.

18. The optical pickup system of claim 17 wherein neighboring generating means are spaced a given distance inter-element distance apart and wherein the inter-element distance between neighboring generating means is substantially equal.

19. The optical pickup system of claim 18 wherein the inter-element distance between neighboring generating means is determined by the equation:

$$X_n = 2Mt[(n^2+n+1)/3]^{1/2}$$

where M is the optical magnification factor, t is the track pitch on the optical recording medium, and n is the relative track orientation.

20. The optical pickup system of claim 2 wherein the plurality of groups of pairs of generating means and detecting means are disposed on a unitary retaining member.

21. The system of claim 20 wherein the unitary retaining member comprises a single substrate and wherein the plurality of groups of pairs of generating means and detecting means are integrally embedded in the single substrate whereby the unitary retaining member provides a monolithic integration of the plurality of groups of pairs of generating means and detecting means in the single substrate.

22. The system of claim 1 wherein the means for directing the at least one optical beam generated by each generating means onto the optical recording medium to generate at least one reflected optical data stream and the means for directing the at least one reflected optical data stream onto the detecting means that is paired with the respective generating means comprise a single optical element.

23. The system of claim 22 wherein the single optical element comprises a small angle beam splitter.

24. The system of claim 23 wherein the small angle beam splitter comprises a bilens with a first half fused to a second half.

25. The system of claim 23 wherein the small angle beam splitter comprises a holographic optical element.

26. An optical pickup system for optical recording mediums with data disposed on a plurality of adjacent track portions thereof, the system comprising:
   a plurality of pairs of generating means for generating at least one optical beam and detecting means for detecting data from a reflected optical data stream;
   a means for directing the at least one optical beam generated by each generating means onto the optical recording medium to generate at least one reflected optical data stream; and
   a means for directing the at least one reflected optical data stream onto the detecting means that is paired with the respective generating means;
   wherein at least the generating means of the plurality of pairs of generating means and detecting means are arranged in a hexagonal lattice relationship whereby the generating means are arranged in a compact configuration.

27. The optical pickup system of claim 26 wherein the pairs of generating means and detecting means are arranged with a first pair of generating means and detecting means assigned to a central track of the optical recording medium and with one or more pairs of generating means and detecting means assigned to succeeding tracks adjacent to the central track up to a border track to achieve the hexagonal lattice arrangement.

28. The optical pickup system of claim 27 wherein the average number of pairs of generating means and detecting means per track follows a generally increasing pattern from the central track to the border track thereby accommodating error accumulation on the optical recording medium by providing, on average, a greater number of pairs of generating means and detecting means that are available for choosing for each successive track away from the central track.

29. The optical pickup system of claim 28 wherein neighboring generating means are spaced a given inter-element distance that is determined by the equation:

$$X_n = 2Mt[(n^2+n+1)/3]^{1/2}$$

where M is the optical magnification factor, t is the track pitch on the optical recording medium, and n is the relative track orientation.

30. The optical pickup system of claim 27 wherein the optical pickup system further comprises a means for tracking the first pair of generating means and detecting means that are assigned to the central track.

31. The optical pickup system of claim 30 wherein the means for tracking the first pair of generating means and detecting means that are assigned to the central track comprises second and third pairs of generating means and detecting means assigned to the central track to provide tracking according to an outrigger method.

32. The optical pickup system of claim 26 wherein the generating means are disposed with at least one generating means assigned to a central track of the optical recording medium and with a number of generating means assigned to each track adjacent to the central track as determined by the formula:

$$p_k = 2Int[(k\delta t/\Delta t+1)/2]$$

where $p_k$ is the number of generating means, Int is the integer part of the value in brackets, k is the incremental track number away from the central track, $\delta t$ is the maximum possible shift between a track with a number 1 and a focal spot on it, and $\Delta t$ is the allowed tracking error whereby the optical pickup system can maintain proper focusing even during unfavorable conditions.

33. The optical pickup system of claim 26 wherein the generating means are disposed with at least one generating means assigned to a central track of the optical recording medium and with a number of generating means assigned to each track adjacent to the central track as determined by the formula:

$$p_k = 2Int[(k^{1/2}\delta t/\Delta t+1)/2]$$

where $p_k$ is the number of generating means, Int is the integer part of the value in brackets, k is the incremental track number away from the central track, $\delta t$ is the maximum possible shift between a track with a number 1 and a focal spot on it, and $\Delta t$ is the allowed tracking error.

34. The optical pickup system of claim 26 wherein there is at least one group of pairs of generating means and detecting means assigned to a single track on the optical recording medium wherein the at least one group of pairs comprises a first pair of generating means and detecting means and a second pair of detecting means wherein the first and second pairs of generating means and detecting means have different coordinates in a direction perpendicular to the single track whereby a correction of optical magnification of the group of pairs relative to the single track on the optical recording medium can be made without a need for mechanical movement of the group of pairs by choosing a pair of generating means and detecting means from the group of pairs dependent upon a relative position of the single track on the optical recording medium.

* * * * *